(12) United States Patent
Salvetti et al.

(10) Patent No.: US 12,056,131 B2
(45) Date of Patent: Aug. 6, 2024

(54) RANKING FOR EFFICIENT FACTUAL QUESTION ANSWERING

(71) Applicant: Microsoft Technology Licensing, LLC, Redmond, WA (US)

(72) Inventors: Franco Salvetti, San Francisco, CA (US); Srinivas Vadrevu, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1003 days.

(21) Appl. No.: 14/709,187

(22) Filed: May 11, 2015

(65) Prior Publication Data

US 2016/0335261 A1    Nov. 17, 2016

(51) Int. Cl.
*G06F 16/2457*    (2019.01)
*G06F 16/2455*    (2019.01)

(52) U.S. Cl.
CPC .... *G06F 16/24578* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,953,720 B1 * | 5/2011 | Rohde | G06F 17/30864 707/706 |
| 8,005,842 B1 | 8/2011 | Pasca et al. | |
| 8,065,290 B2 | 11/2011 | Hogue | |
| 8,332,394 B2 | 12/2012 | Fan et al. | |
| 8,340,955 B2 | 12/2012 | Brown et al. | |
| 8,655,866 B1 | 2/2014 | Provine et al. | |
| 8,666,730 B2 | 3/2014 | Todhunter et al. | |
| 8,768,932 B1 * | 7/2014 | Kacholia | G06F 17/30864 707/705 |
| 9,317,551 B1 * | 4/2016 | Zander | G06F 17/3041 |

(Continued)

OTHER PUBLICATIONS

Kumar, et al., "A New Architecture of Automatic Question Answering System using Ontology", In Proceedings of International Journal of Computer Applications, vol. 97, No. 20, Jul. 2014, pp. 1-4.

(Continued)

*Primary Examiner* — Dinku W Gebresenbet
*Assistant Examiner* — Dustin D Eyers

(57) ABSTRACT

Methods and systems are provided for improving efficiency and precision in factual question answering in a search environment. In aspects, the methods and systems involve offline identification of answers correlated with one or more factual questions that are generated offline for each document within a document collection. Thereafter, upon receiving a factoid query during runtime, candidate documents that are retrieved in response to the factoid query are scanned for a factual question that matches the factoid query. For each factual question that matches the factoid query, a corresponding candidate answer can be identified. Thereafter, each candidate answer can be assigned a score that is a function of the number of candidate documents in which the candidate answer was identified and the relevancy of those candidate documents to the factoid query. The candidate answer having the highest score can be provided to the user in response to the factoid query.

20 Claims, 11 Drawing Sheets

(56) References Cited

U.S. PATENT DOCUMENTS

| | | | |
|---|---|---|---|
| 9,418,567 B1* | 8/2016 | Chen | G09B 7/06 |
| 9,471,689 B2* | 10/2016 | Allen | G06F 17/30867 |
| 2005/0240455 A1* | 10/2005 | Walters | G06Q 40/00 |
| | | | 705/35 |
| 2009/0089252 A1* | 4/2009 | Galitsky | G06F 17/30637 |
| 2010/0228711 A1* | 9/2010 | Li | G06F 17/30864 |
| | | | 707/706 |
| 2011/0191276 A1 | 8/2011 | Cafarella et al. | |
| 2012/0089622 A1 | 4/2012 | Fan et al. | |
| 2012/0098202 A1* | 4/2012 | Richert | A63F 11/0074 |
| | | | 273/431 |
| 2013/0262439 A1* | 10/2013 | Hao | G06F 17/3064 |
| | | | 707/722 |
| 2013/0304730 A1* | 11/2013 | Zhou | G06Q 30/02 |
| | | | 707/723 |
| 2014/0280114 A1 | 9/2014 | Keysar et al. | |
| 2015/0161230 A1* | 6/2015 | Alkov | G06F 17/30705 |
| | | | 707/737 |
| 2015/0193505 A1* | 7/2015 | Ryu | G06F 17/30864 |
| | | | 707/723 |

OTHER PUBLICATIONS

Grappy, et al., "Methods Combination and ML-based Re-ranking of Multiple Hypothesis for Question-Answering Systems", In Proceedings of Workshop on Innovative Hybrid Approaches to the Processing of Textual Data, Apr. 23, 2012, pp. 87-96.

Umamehaswari, et al., "Improved Question Answering System by Semantic Reformulation", In Proceedings of Fourth International Conference on Advanced Computing, Dec. 13, 2012, 4 pages.

Wu, et al., "Question-driven Classification of Retrieved Documents", In Proceedings of First Australasian User Interface Conference, Jan. 31, 2000, 7 pages.

Grappy, et al., "Selecting Answers to Questions from Web documents by a Robust Validation Process", In IEEE/WIC/ACM International Conference on Web Intelligence and Intelligent Agent Technology, vol. 1, Aug. 22, 2011, pp. 55-62.

Si, et al., "Confucius and Its Intelligent Disciples: Integrating Social with Search", In Proceedings of 36th International Conference on Very Large Data Bases, vol. 3, No. 2, Sep. 13, 2010, 12 pages.

Chang, et al., "A Survey of Web Information Extraction Systems", In Proceedings of IEEE Transactions on Knowledge and Data Engineering, vol. 18, No. 10, Oct. 2006, pp. 1411-1428.

Crescenzi, et al., "RoadRunner: Towards Automatic Data Extraction from Large Web Sites", In Proceedings of 27th International Conference on Very Large Data Bases, Sep. 11, 2001, pp. 109-118.

Adelberg, Brad, "NoDoSE: A Tool for Semi-Automatically Extracting Structured and Semi-structured Data from Text Documents", In Proceedings of ACM SIGMOD International Conference on Management of Data, Jun. 1, 1998, pp. 283-294.

Robertson, et al., "Simple BM25 Extension to Multiple Weighted Fields", In Proceedings of Thirteenth ACM International Conference on Information and Knowledge Management, Nov. 13, 2004, pp. 42-49.

Page, et al., "The PageRank Citation Ranking: Bringing Order to the Web", In Technical Report, Jan. 29, 1998, pp. 1-17.

* cited by examiner

RANKING FOR EFFICIENT FACTUAL QUESTION ANSWERING

BACKGROUND

The use of search engines to locate relevant documents within a database, enterprise intranet, or the Internet has become commonplace. At a high level, most search engines function by performing three basic steps: identifying all documents that match the search criteria (the "candidate documents"); ranking the candidate documents based on a predicted relevance; and presenting the results to the user beginning with the most relevant.

For certain types of search queries, known as "factoid queries" or "factual questions," a precise answer for the factoid query exits within the document corpus (e.g., document collection within a database, enterprise intranet, or Internet). Thus, in response to this type of query, as the answer is available within the document corpus, it would be desirable for a search engine to directly provide the answer to the user, along with the set of candidate documents that contain the answer. However, while many modern search engines are able to provide highly relevant candidate documents to the user in response to a factoid query, the user must still review the candidate documents to obtain the answer. Moreover, in some cases, conflicting answers to the factoid query may exist within the document collection, requiring the search engine to evaluate each candidate document that references a conflicting answer in order to identify and provide the correct or desired answer to the user. Differentiating between conflicting answers during runtime requires significant processing and other resources, and may cause latency and/or result inconsistency or imprecision.

It is with respect to these and other general considerations that embodiments have been described. Also, although relatively specific problems have been discussed, it should be understood that the embodiments should not be limited to solving the specific problems identified in the background.

SUMMARY

In summary, the disclosure generally relates to a search environment having improved efficiency and precision in factual question answering in a search environment. A factoid query is a question for which there exists a precise answer. For example, the factoid query, "What is the capital of California?" has a precise answer, "Sacramento." However, in some cases, a factoid query may have conflicting answers within a document collection. For instance, numerous conflicting answers within a set of candidate documents may be returned based on the factoid query, "Who is the President?" That is, the candidate documents may identify different answers depending on the date of the document, a geographic location associated with the document, an organizational entity associated with the document, etc. During runtime, significant processing resources, as well as processing time, are needed to evaluate the candidate documents to identify the correct answer (e.g., the answer desired by the user) to this factoid query. For instance, a desired answer in response to the above factoid query from the perspective of a first user may be "President Obama" (e.g., the President of the United States), while a desired answer from the perspective of a second user may be "Pranab Mukherjee" (e.g., the President of India). When both of these answers are present in the document collection, the search engine must evaluate additional factors and/or clues to determine which answer is the desired answer to a factoid query submitted by a particular user.

In aspects, a system is described. The system includes at least one processing unit and at least one memory storing computer executable instructions that, when executed by the at least one processing unit, cause the system to perform a method of providing an answer to a factoid query. The method involves identifying a first answer to one or more factual questions in a first document of a document collection and associating the first answer and the one or more factual questions with the first document. The method further involves receiving a factoid query and matching the factoid query to a first factual question associated with a first document. Additionally, the method involves identifying a first answer correlated with the first factual question and calculating a first score for the first answer based at least in part on a relevancy of the first document to the factoid query.

In further aspects, a server computing device is described. The server computing device includes at least one processing unit and at least one memory storing computer executable instructions that, when executed by the at least one processing unit, cause the server computing system to perform a method of providing an answer to a factoid query. The method involves identifying one or more answers to one or more factual questions in each document of a document collection and associating at least one answer correlated with at least one factual question with each document of the document collection. The method further involves receiving a factoid query and matching the factoid query to a first factual question associated with a first document. Additionally, the method involves identifying a first answer correlated with the first factual question associated with the first document and calculating a first score for the first answer based at least in part on a relevancy of the first document to the factoid query.

In still further aspects, a method implemented on a computing device for providing an answer to a factoid query is described. The method involves identifying one or more answers to one or more factual questions in each document of a document collection and associating at least one answer correlated with at least one factual question with each document of the document collection. The method further involves receiving a factoid query and matching the factoid query to a first factual question associated with a first document. Additionally, the method involves identifying a first answer correlated with the first factual question associated with the first document and calculating a first score for the first answer based at least in part on a relevancy of the first document to the factoid query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
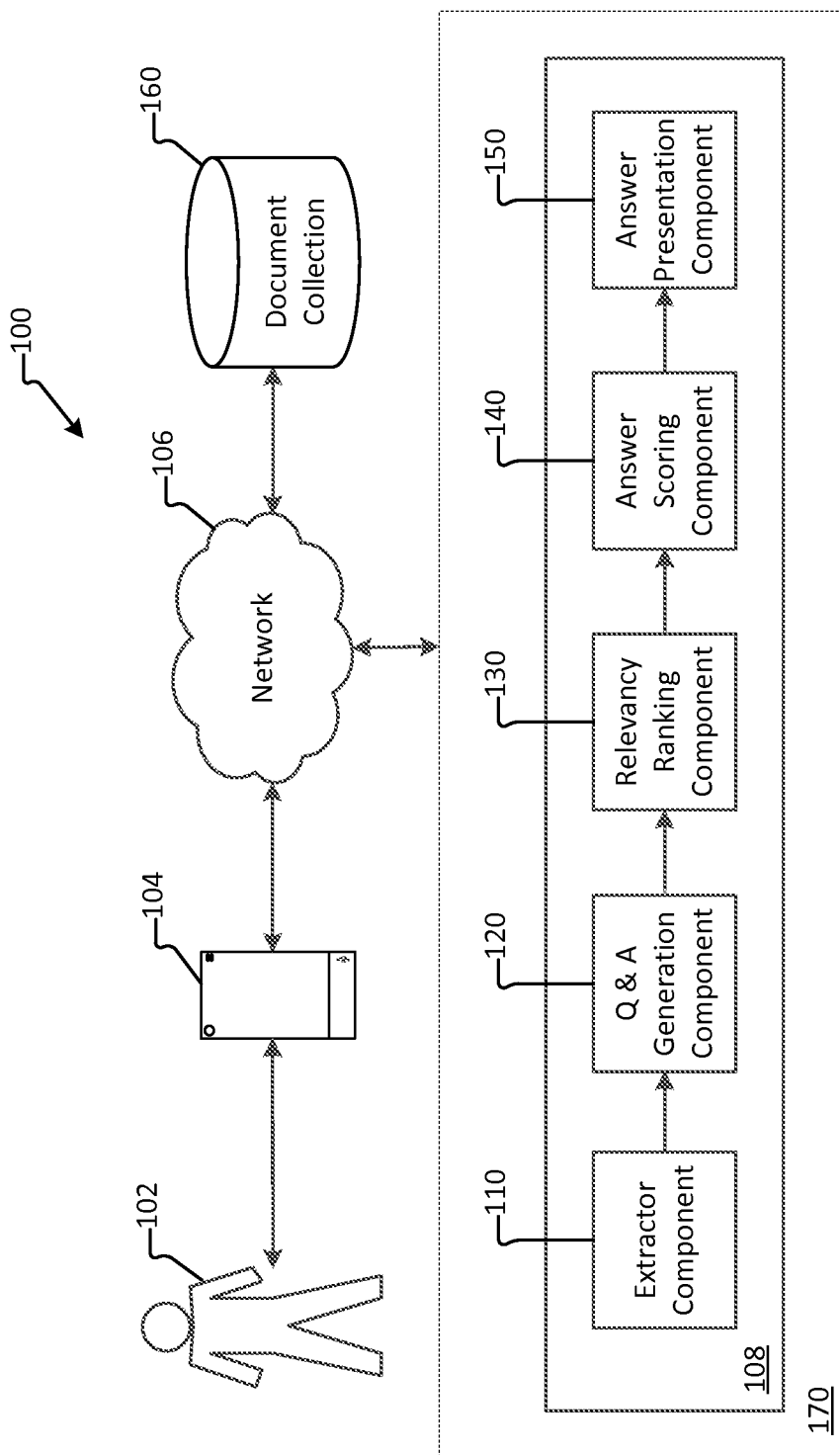
FIG. 1 illustrates an exemplary system implemented at a server computing device for efficient factual question answering, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure generally relates to methods and systems for improved efficiency and precision in factual question answering in a search environment. In aspects, the methods and systems involve offline identification of answers correlated with one or more factual questions that are generated offline for each document within a document collection. The document collection may include a set of textual files in a store, such as a database, enterprise intranet, or the Internet. In aspects, each document (or text file) in the document collection may be extracted offline to identify answers to factual questions within the document. As used herein, the term "offline" is used to refer to a processing period that occurs prior to receiving a factoid query and is not intended to imply a lack of connectivity. Alternatively, "runtime" is used herein to refer to a processing period initiated upon receiving a factoid query that progresses until the query is resolved or fails.

According to further aspects, upon receiving a factoid query during runtime, the document collection is searched to retrieve one or more candidate documents. Additionally, each candidate document associated with a factual question that matches the factoid query may be identified and ranked based on a predicted relevance to the factoid query. For each factual question that matches the factoid query, a corresponding candidate answer can be identified. Thereafter, each candidate answer may be assigned a score that is a function of the number of candidate documents in which the candidate answer was identified and the relevancy of those candidate documents to the factoid query. The candidate answer having the highest score may be provided to the user in response to the factoid query.

Thus, during runtime, efficiency is increased by leveraging the preliminary offline identification of answers and the offline generation of factual questions corresponding to the identified answers within each document of a document collection. During runtime, candidate answers can be quickly identified by matching the previously generated factual questions within the candidate documents to the factoid query. Moreover, precision is increased by scoring the candidate answers by leveraging a relevancy of each candidate document to the factoid query. The methods and systems are highly scalable because preliminary processing of the document collection—even very large document collections such as the Internet—can be conducted offline, greatly reducing the processing requirements during runtime. It is with respect to these and other general considerations that embodiments have been made.

FIG. 1 illustrates an exemplary system implemented at a server computing device for efficient factual question answering, according to an example embodiment.

In aspects, a search query (e.g., factoid query) may be received as input on a client computing device 104. In other aspects, a search engine 170 may be implemented on client computing device 104. In a basic configuration, the client computing device 104 is a handheld computer having both input elements and output elements. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for inputting a search query and receiving results may be utilized.

In aspects, as illustrated in FIG. 1, the search engine 170 may be implemented on a server computing device 108. The server computing device 108 may provide data to and from the client computing device 104 through a network 106. In one aspect, the network 106 is a distributed computing network, such as the internet. In aspects, the search engine 170 may be implemented on more than one server computing device 108, such as a plurality of server computing devices 108. As discussed above, the server computing device 108 may provide data to and from the client computing device 104 through the network 106. The data may be communicated over any network suitable to transmit data. In some aspects, the network 106 is a computer network such as an enterprise intranet and/or the Internet. In this regard, the network 106 may include a Local Area Network (LAN), a Wide Area Network (WAN), the Internet, wireless and wired transmission mediums. In this regard, a textual or voice input may be received at the client computing device 104 and transmitted over the network 106 for processing by the search engine 170 at the server computing device 108.

As illustrated in FIG. 1, the search engine 170 may include an extractor component 110, a question and answer (Q&A) generation component 120, a relevancy ranking component 130, an answer scoring component 140 and an answer presentation component 150. The various components may be implemented using hardware, software, or a combination of hardware and software. The search engine 170 may be configured to receive and process textual and/or voice input. In one example, a textual and/or voice input may include phrases, words, and/or terms in the form of a textual and/or spoken language input (e.g., a user text or voice query). In this regard, the search engine 170 may be configured to receive the textual and/or spoken language input from user 102. In aspects, the search engine 170 may be configured to convert the spoken language input into a textual query. For example, the search engine 170 may include standard speech recognition techniques known to those skilled in the art such as "automatic speech recognition" (ASR), "computer speech recognition", and "speech to text" (STT). In some cases, the search engine 170 may include standard text to speech techniques known to those skilled in the art such as "text to speech" (TTS). In one example, the textual query is processed by search engine 170, for example, to obtain search results.

In some aspects, search engine 170 performs at least some processing prior to receiving the textual and/or spoken language input. As provided herein, the processing period prior to receiving the textual and/or spoken language input is referred to as an interim or "offline" processing period. As used herein, however, the term "offline" does not imply a lack of connectivity and/or communication, e.g., over network 106, with client computing device 104 and/or document collection 160. Moreover, while at least some processing steps may be conducted during an offline processing period, as described further below, this does not preclude such processing steps from being performed during runtime.

As illustrated by FIG. 1, the client computing device 104 and the server computing device 108 may further be in communication with a document collection 160 storing a plurality of documents. Document collection 160 may be stored in a local or remote database, within an enterprise intranet, or in distributed locations over the Internet. In aspects, the document collection 160 may include a plurality of textual files, including formatted or plain text in any file format such as digital word processing documents, spreadsheets, presentations, webpages, text messages, tweets, email messages, and the like.

In aspects, the search engine 170 and various components, e.g., extractor component 110 and Q&A generation component 120, may perform various steps prior to receiving the textual and/or spoken language input from user 102. For example, during an offline processing period, extractor component 110 may extract at least one n-tuple for each document of the document collection. As used herein, an "n-tuple" refers to a structured set of elements. For example, an n-tuple may be a sentence, a clause, an equation, a sequence of numbers, and the like. In some cases, multiple n-tuples (e.g., a set of n-tuples) may be extracted from a document.

Extractor component 110 may implement any suitable technique for extracting n-tuples from documents in document collection 160, including common techniques presently known or techniques developed in the future. Traditionally, a common approach to extract structured data from a document uses a "wrapper" that relies on the structure of the document to extract specific pieces of information. However, since wrappers depend upon the format and structure of the document, they are not very robust in handling changes to these formats. Recent advances in extraction techniques rely on semi-structured information extraction from HTML pages, natural language processing (NLP) techniques such as speech taggers, and semantic tagging and shallow parsing to build relationships between various components within a sentence. These approaches utilize recognizable keywords to identify specific relationships or patterns, e.g., in HTML DOM trees, and are more resilient to changes in the structure of the document. In aspects, any of the techniques described above, or any other technique presently known or developed in the future, may be implemented by extractor component 110 to extract data (e.g., n-tuples) from documents in the document collection 160.

As provided above, during an offline processing period, extractor component 110 may extract at least one n-tuple for each document in document collection 160. Each n-tuple may provide partial information regarding a "relation" (e.g., a topic, subject, issue, theme, and the like, about which the document provides information). In aspects, extractor component 110 may further evaluate each extracted n-tuple to identify one or more attribute-value pairs associated with the relation. For instance, an extracted n-tuple related to the relation "wedding" may contain one or more associated attribute-value pairs, e.g., {date, Aug. 8, 2013}; {time, 6:00 pm}; {venue, Carlyle Hotel}; {geographic location; Cleveland, Ohio}; {bride, Sarah Martin}; and the like. In some cases, an attribute (e.g., geographic location) may be associated with one or more sub-attributes that are also paired with values. For example, the attribute "geographic location" may further be associated with sub-attribute-value pairs such as {city, Cleveland}; {state, Ohio}; and {street address, 123 Main Street}. As may be appreciated, information extracted from each document may be structured in a hierarchical or other organizational format. Thus, a single document may reference a plurality of different relations, each relation may be associated with one or more n-tuples, and each n-tuple may contain one or more attribute-value pairs and/or sub-attribute-value pairs.

Additionally, during an offline processing period, Q&A generation component 120 may evaluate each attribute-value pair associated with an n-tuple to identify potential answers to factual questions regarding a relation in a document. As described above, an n-tuple associated with a wedding relation may contain one or more attribute-value pairs such as {date, Aug. 8, 2013}; {time, 6:00 pm}; {location, Brown Palace}; {bride, Sarah Martin}; {groom, Dave Hasting}; and the like. In aspects, each attribute-value pair can be seen as a fact that is a potential answer for a set of factual questions. For example, the fact "Aug. 8, 2013" can be identified as an answer to the factual question "When was Sarah's wedding?" Similarly, the fact "Sarah Martin" can be identified as an answer to the factual question "Who is Dave Hasting's wife?" Moreover, further extrapolation can be performed to identify related answers to attribute-value pairs. For instance, a related answer "Thursday" can be extrapolated from the fact "Aug. 8, 2013" as an answer to the factual question "What day was Sarah's wedding?" In at least some aspects, Q&A generation component 120 may automatically identify at least one answer for each attribute-value pair.

Additionally, during an offline processing period, Q&A generation component 120 may generate one or more "factual questions" based on each answer identified for an attribute-value pair. A "factual question," similar to a factoid query, is a question that requests a precise or discrete answer. As may be appreciated, a plurality of different factual questions may yield the same fact or answer. For instance, the factual questions "Who is Dave Hasting's wife?"; "Who did Dave Hasting's marry?" and "What is the bride's name for the wedding on Aug. 8, 2013?" would each yield the same answer based on the attribute-value pairs detailed above, i.e., "Sarah Martin." In aspects, Q&A generation component 120 may generate at least one factual question for each answer identified for an attribute-value pair. In some aspects, one or more factual questions may be generated automatically for each fact (or answer). For example, one or more factual questions may be automatically generated based on any suitable algorithm either currently known or developed in the future.

According to further aspects, during an offline processing period, Q&A generation component 120 may correlate each identified answer with one or more factual questions. For example, Q&A generation component 120 may generate a structured data set, such as a table or index, which correlates each identified answer with a factual question for which the answer could be returned (e.g., forming an answer-factual question pair). In aspects, Q&A generation component 120 may correlate each answer identified for each attribute-value pair with at least one factual question for each document in document collection 160. Thus, Q&A generation component 120 may generate a plurality of answer-question pairs for each document. In some aspects, as noted above, the same answer may be returned for different factual questions. In this case, more than one answer-question pair for a document may reference the same answer, e.g., answer$^1$-question$^1$ and answer$^1$-question$^2$. Additionally, as provided above, different documents may identify different answers for the same factual question, e.g., answer$^1$-question$^1$ and answer$^2$-question$^1$. In aspects, Q&A generation component 120 may organize answers correlated with one or more factual questions in a suitable structure or format that can be read by search engine 170 during runtime. That is, in some aspects, rather than generating answer-question pairs, Q&A generation component 120 may generate an index wherein each answer is associated with a reference or pointer to one or more factual questions. For simplified discussion, the term "answer-question pair" encompasses any technique either presently known or developed in the future for directly or indirectly correlating an answer with a factual question.

In further aspects, during an offline processing period, Q&A generation component 120 may associate each answer-question pair with the document from which the answer was identified. In some cases, a plurality of answer-question pairs may be associated with each document in document collection 160. For instance, the answer-question pairs may be appended to each document as metadata (or an index correlating answers with factual questions may be appended to each document as metadata). In other aspects, answer-question pairs may be associated with the document using pointers directed to one or more alternative storage locations, e.g., a database storing the answer-question pairs (or a database storing an index correlating answers with factual questions). In still other aspects, Q&A generation component 120 may add the answer-question pairs (or an index correlating answers with factual questions) to a header or other field associated with the document. In some cases, the answer-question pairs may be associated with the document in a structured format that can be read by search engine 170 during runtime.

According to further aspects, each factual question associated with a document (e.g., via an answer-question pair, an index, etc.) may be represented in a unique question-document pair (q, d), which identifies both the factual question and the document with which it is associated. The question-document pairs may be associated with the document (e.g., as metadata, via pointers, in a header field, etc.) and/or may be stored along with question-document pairs identified for each document of the document collection 160 (e.g., in an index).

In some aspects, the search engine 170 and various components, e.g., relevancy ranking component 130, answer scoring component 140 and answer presentation component 150, may perform at least some steps upon receiving a textual and/or spoken language input (e.g., search query). For instance, the search query may be input by user 102 into client computing device 104, routed through network 106, and received by server computing device 108 running the search engine 170. In aspects, the search query may be received as textual or spoken input from the user. In aspects, spoken input may be converted to textual input using standard speech recognition techniques known to those skilled in the art, as described above. Alternatively still, the factoid query may be a machine-generated query initiated by client computing device 104 or another client or server computing device. As provided herein, when the search query is received, a "runtime" period begins.

According to aspects, the term "search query" broadly refers to any request for information posed to search engine 170. In response to the search query, search engine 170 may parse the search query to identify search criteria (e.g., search keys), generally identify all documents in document collection 160 that match the search criteria (e.g., the "candidate documents"), rank the candidate documents based on a predicted relevance to the search criteria, and present the results to the user beginning with the most relevant candidate document. In more specific aspects, the search query may be a factoid query. A "factoid query" is a type of search query that requests a precise or discrete answer. In this case, in addition to or in lieu of returning the candidate documents, the results include the precise answer.

Upon receiving the search query (e.g., factoid query), the relevancy ranking component 130 may perform various steps during runtime. For example, the relevancy ranking component 130 may parse the factoid query to identify relations (or search keys) associated with the factoid query. The term "parsing" as used herein generally refers to evaluating the factoid query based on linguistics (e.g., morphology, syntax, semantics, input language, and the like), ancillary hints (e.g., geographic indicators, user search history, and the like), or otherwise, to identify search criteria for the factoid query. For instance, a particular factoid query may contain particular terms, particular semantics, and be associated with a particular geographic indicator (e.g., based on an Internet Protocol (IP) address associated with client computing device 104). Another factoid query may contain different terms, different semantics, but the same geographic locator, for example. Alternatively, another factoid query may contain different terms or semantics, but based on ascribing a same or similar meaning to these terms and semantics, the relevancy ranking component 130 may identify the same or similar search criteria for this factoid query. Upon identifying the search criteria, one or more candidate documents may be retrieved by the relevancy ranking component 130 from the document collection.

In aspects, after parsing the factoid query and retrieving one or more candidate documents, the relevancy ranking component 130 may compare the factoid query with the one or more factual questions associated with each candidate document. As detailed above, during an interim or offline period, answer-question pairs are correlated and associated with each document of the document collection. For example, answer-question pairs (or an index correlating the answers with one or more factual questions) may be appended as metadata, associated using pointers, or otherwise associated with each document of document collection 160. Furthermore, the appended answer-question pairs may be readable by the relevancy ranking component 130 during runtime. Thus, during runtime, relevancy ranking component 130 may compare the factoid query to the factual questions associated with each candidate document. In some cases, metadata for each candidate document may be scanned during runtime to identify associated factual questions that match the factoid query. In other cases, pointers for each candidate document may be followed during runtime to identify associated factual questions that match the factoid query.

In aspects, when a factual question "matches" the factoid query, it may share at least some of the search criteria identified for the factoid query (e.g., particular terms, particular semantics, particular geographic indicator, etc.). In this case, some factual questions may "match" the factoid query more closely than others. In aspects, a question-document pair (q, d) may be associated with each candidate document having a factual question that matches the factoid query. Moreover, based on a correlation established by the answer-question pairs, when a matching factual question is identified, the corresponding answer (e.g., "candidate answer") to the factual question may be obtained from the answer-question pair to which the factual question belongs. Alternatively, e.g., when answers are correlated to factual questions based on an index, the corresponding answer (e.g., "candidate answer") to the factual question may be obtained by reference to the index.

In further aspects, during runtime, the relevancy ranking component 130 may rank each candidate document, or (q, d) pair, based on a predicted relevancy to the factoid query. For example, relevancy ranking component 130 may apply a ranking function, or algorithm, to one or more characteristics, or ranking features, of the candidate documents to obtain a score for each candidate document. Traditionally, ranking features may include static features, e.g., related to the type, date, or length of the candidate document, or dynamic features, e.g., based on term frequencies or document frequencies. Term frequency refers to the number of times a term occurs in a document (or in a particular property of the document, e.g., title property, body property, etc.). Document frequency refers to the number of documents in the document collection in which the term occurs. For example, for a factoid query with a certain set of search criteria (e.g., particular terms, semantics, etc.), a candidate document that exhibits a higher frequency of the particular terms, for instance, may be ranked higher. Upon applying the ranking algorithm, the candidate documents, or (q, d) pairs, are ordered based on decreasing predicted relevance to the factoid query. For instance, a first candidate document ($q_1$, $d_1$) may be the highest ranking, and thus most relevant, candidate document to the factoid query. Thereafter, a second candidate document ($q_2$, $d_2$), having higher relevancy than a third candidate document ($q_3$, $d_3$), and so on, are ranked in order of decreasing relevancy to the factoid query.

According to further aspects, after the relevancy ranking component 130 ranks the candidate documents, answer scoring component 140 may score one or more answers returned in the candidate documents. As detailed above, during an interim or offline period, answers are correlated with one or more factual questions and then associated with each document of document collection 160. For example, answer-question pairs may be appended as metadata, associated using pointers, or otherwise associated with each document in document collection 160. Furthermore, as detailed above, answer-question pairs may be readable by answer scoring component 140 during runtime. Thus, in some cases, metadata for each candidate document, d, of a (q, d) pair may be scanned during runtime to identify an answer, a, correlated with the factual question, q, that matched the factoid query. In other cases, pointers for each document, d, of a (q, d) pair may be followed during runtime to identify an answer, a, correlated with the factual question, q, that matched the factoid query. In aspects, each answer, a, that is correlated with a matching factual question, q, within a candidate document, d, is called a "candidate answer."

For instance, with reference to the example above, for the factoid query "Who is the President?" a number of candidate answers may be identified. That is, a first candidate answer, $a_1$, identified in a first document, $d_1$, may be "Barak Obama," while a second candidate answer, $a_2$, identified in a second document, $d_2$, may be "Pranab Mukherjee." In fact, for this example, there may be a number of different candidate answers, including a third candidate answer, $a_3$, "Joachim Gauck" (President of Germany), a fourth candidate answer, $a_4$, "C. Douglas Mcmillon" (President and CEO of Walmart), etc.

In further aspects, the answer scoring component 140 may associate each candidate answer with one or more candidate documents in which the answer was identified. That is, in aspects, the same candidate answer may be identified in a plurality of candidate documents, or (q, d) pairs. For instance, a first candidate answer, $a_1$, may be identified in a second candidate document ($q_2$, $d_2$), a fourth candidate document ($q_4$, $d_4$), and a fifth candidate document ($q_5$, $d_5$), as ranked by the relevancy ranking component 130. Additionally, additional candidate answers (e.g., $a_2$, $a_3$, $a_4$, etc.) may be identified in different candidate documents. For example, a second candidate answer, $a_2$, may be associated with a first candidate document ($q_1$, $d_1$) and a third candidate document ($q_3$, $d_3$). Alternatively, a third candidate answer, $a_3$, may be associated with a ninth candidate document ($q_9$, $d_9$) and a fourth candidate answer, $a_4$, may be associated with a twentieth candidate document ($q_{20}$, $d_{20}$), and so on.

According to further aspects, answer scoring component 140 may apply an appropriate factor to each candidate answer to account for the relevancy ranking of the candidate documents which returned the candidate answer. For instance, the answer scoring component may assign a weight to each candidate document based on an associated relevancy ranking. In aspects, the weight may be based on any suitable scale, e.g., as a function of decreasing relevancy, and may be assigned by any suitable means, e.g., applied as a simple multiplier. For instance, in some cases, the weight may be based on a simple linear function with decreasing slope. Alternatively, the weight may be based on a decreasing exponential or geometric function. For example, in this case, highly relevant candidate documents may be assigned a disproportionately high weight, with weights decreasing exponentially as candidate documents become less relevant. Alternatively, using a simple linear function, the first candidate document ($q_1$, $d_1$) may be assigned a weight of "1"; the second candidate document ($q_2$, $d_2$) may be assigned a weight of "0.99"; the third candidate document ($q_3$, $d_3$) may be assigned a weight of "0.98"; and so on. In aspects, an appropriate weight scale may be selected based on the number of candidate documents. For example, for a set of ten candidate documents, weights of "1", "0.9", "0.8", "0.7", and so on, may be appropriate. Alternatively, for a set of 100 candidate documents, weights of "1", "0.99", "0.98", "0.97", and so on, may be appropriate.

In aspects, upon assigning a weight to each candidate document, the answer scoring component 140 may assign a score to each candidate answer that is a function of the number of candidate documents in which the candidate answer was identified and the relative relevancy (e.g. weight) of those candidate documents. For example, in some aspects, a score for each candidate answer may be calculated as a simple sum of the weighted candidate documents in which the candidate answer was identified. In other aspects, other scoring functions may be utilized. In general, a higher score is awarded to a candidate answer that is identified in higher ranking candidate documents and/or a larger number of candidate documents. For instance, based on the examples for the simple linear weight scale outlined above, a score for the first candidate answer, $a_1$, may be calculated as follows:

$$\text{Score}(a_1)=(0.99)*(q_2,d_2)+(0.97)*(q_4,d_4)+(0.96)*(q_5,d_5)=2.92$$

Alternatively, scores for the second, third and fourth candidate answers (e.g., $a_2$, $a_3$, $a_4$), may be calculated as follows:

$$\text{Score}(a_2)=(1)*(q_1,d_1)+(0.98)*(q_3,d_3)=1.98$$

$$\text{Score}(a_3)=(0.92)*(q_9,d_9)=0.92$$

$$\text{Score}(a_4)=(0.81)*(q_{20},d_{20})=0.81$$

According to the above example, the first candidate answer, $a_1$, was identified in slightly less relevant candidate documents (e.g., second, fourth and fifth candidate documents) than the second candidate answer, $a_2$ (e.g., first and third candidate documents). However, the first candidate answer received a higher score (e.g., 2.92) than the second candidate answer (e.g., 1.98) because the first candidate answer was identified by more candidate documents (e.g., three candidate documents) than the second candidate answer (e.g., two candidate documents). Alternatively, if the weight scale applied had been based on a decreasing exponential or geometric function, the second candidate answer may have received a higher score because it was identified in candidate documents with higher relevancy rankings. In aspects, scoring of the candidate answers may be adapted or tailored such that the most likely answer to the factoid query receives the highest score. For instance, an appropriate scoring algorithm may be tailored based on statistical analysis, learning algorithms, or any other suitable method, to strike an appropriate balance between the number and relevancy of the candidate documents that return a particular candidate answer.

As illustrated by FIG. 1, an answer presentation component 150 may determine a best answer to the factoid query. In aspects, the best answer to the factoid query is the candidate answer that was assigned the highest score by the answer scoring component 140. In further aspects, the best answer represents the most likely answer desired by user 102. Thereafter, the answer presentation component 150 may provide the best answer to the factoid query to user 102, e.g., by presenting the best answer on a display or by providing the best answer via an audio speaker (TTS). In some aspects, the candidate documents in which the best answer was identified may also be displayed to user 102 in order of decreasing relevancy. In other aspects, the candidate documents in which the best answer was identified are not provided to the user, but may be retrieved upon request.

As should be appreciated, the various devices, components, etc., described with respect to FIG. 1 are not intended to limit the systems and methods to the particular components described. Accordingly, additional components may be used to practice the methods and systems herein and/or some components described may be excluded without departing from the methods and systems disclosed herein.

Figure 2:
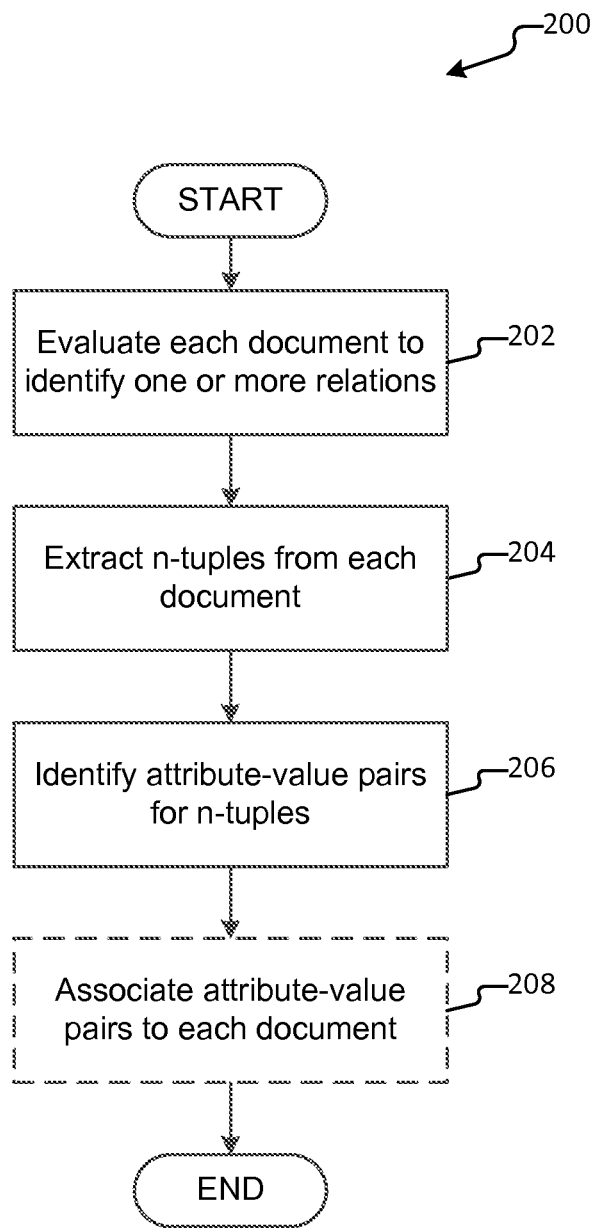
FIG. 2 illustrates an exemplary method for extracting n-tuples from one or more documents of a document collection, according to an example embodiment.

FIG. 2 illustrates an exemplary method for extracting n-tuples from one or more documents of a document collection, according to an example embodiment.

Method 200 begins with evaluation operation 202 where each document in a document collection is evaluated for one or more relations contained in the document. In at least some aspects, evaluation operation 202 may be performed prior to receiving a search query during an interim or offline period. As used herein, a relation may be any topic, subject, issue, theme, and the like, about which the document provides information. In some aspects, each document references at least one relation. In some cases, as described above, an extractor component (e.g., extractor component 110) may perform evaluation operation 202 by any suitable means either currently known or developed in the future. In other cases, another processing or parsing component may perform evaluation operation 202 by any suitable means either currently known or developed in the future.

At extract operation 204, an extractor component extracts at least one n-tuple associated with the at least one identified relation for each document of the document collection. In at least some cases, extract operation 204 may be performed prior to receiving a search query, e.g., during an interim or offline period. As used herein, an "n-tuple" refers to a structured set of elements. For example, an n-tuple may be a sentence, a clause, an equation, a sequence of numbers, and the like. In some cases, multiple n-tuples (e.g., a set of n-tuples) may be extracted for each relation referenced in a document. Each n-tuple may provide partial information regarding a corresponding relation. As explained above, any suitable extraction technique may be used to extract n-tuples from a document. In aspects, an extractor component (e.g., extractor component 110) may perform extract operation 204 on each document of a document collection by any suitable means either currently known or developed in the future.

At identify operation 206, each n-tuple may be evaluated to identify one or more attribute-value pairs associated with the relation. Identify operation 206 may be performed during an interim or offline period prior to receiving a search query. In some aspects, an n-tuple may contain at least one attribute-value pair associated with the relation. For instance, an extracted n-tuple associated with a wedding (e.g., the relation) may contain one or more attribute-value pairs, e.g., {date, Aug. 8, 2013}; {time, 6:00 pm}; {venue, Brown Palace}; {geographic location; Cleveland, Ohio}; {bride, Sarah Martin}; and the like.

In some cases, an attribute (e.g., geographic location) may be associated with one or more sub-attributes that are also paired with values. For example, the attribute "geographic location" may further be associated with sub-attribute-value pairs such as {city, Cleveland}; {state, Ohio}; and {street address, 123 Main Street}. As may be appreciated, information extracted from each document may be structured in a hierarchical or other organizational format. Thus, a single document may reference a plurality of different relations, each relation may be associated with one or more n-tuples, and each n-tuple may contain one or more attribute-value pairs and/or sub-attribute-value pairs. As explained above, any suitable technique either currently known or developed in the future may be used to identify attribute-value pairs associated with an n-tuple. In aspects, an extractor component (e.g., extractor component 110) may perform identify operation 206 for each n-tuple extracted from each document of a document collection.

At optional associate operation 208 (identified by dashed lines), the identified attribute-value pairs for each relation may be associated with the document. As associate operation 208 is optional, in at least some cases, associate operation 208 is not performed. In other cases, optional associate operation 208 may be performed during an interim or offline period prior to receiving a search query. For instance, the attribute-value pairs corresponding to each relation may be appended to the document as metadata. In other aspects, the attribute-value pairs corresponding to each relation may be associated with the document using pointers directed to one or more alternative storage locations for the attribute-value pairs. In still other aspects, the attribute-value pairs corresponding to each relation may be added to a header or other field associated with the document. In some cases, the attribute-value pairs corresponding to each relation may be associated with the document in a structured format that may be read by a search engine (e.g., search engine 170) during runtime. When optional associate operation 208 is performed, attribute-value pairs may be associated with each document within the document collection on a document-by-document basis. In aspects, a relevancy ranking component (e.g., relevancy ranking component 130) may perform optional associate operation 208.

As should be appreciated, operations 202-208 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
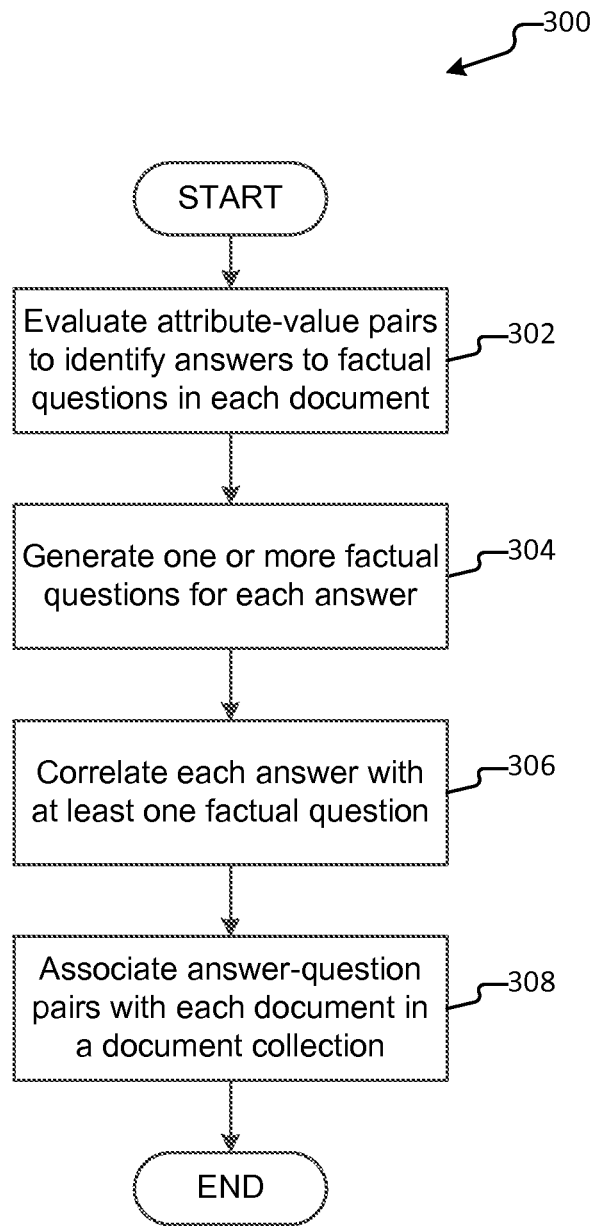
FIG. 3 illustrates an exemplary method for identifying answers to factual questions based on n-tuples extracted from a document, according to an example embodiment.

FIG. 3 illustrates an exemplary method for identifying answers to factual questions based on n-tuples extracted from a document, according to an example embodiment.

Method 300 begins with answer identification operation 302 where each attribute-value pair associated with an n-tuple is evaluated to identify potential answers to factual questions in a document. In aspects, answer identification operation 302 may be performed prior to receiving a search query during an interim or offline period. As described above, an n-tuple associated with a wedding relation may contain one or more attribute-value pairs such as {date, Aug. 8, 2013}; {time, 6:00 pm}; {location, Brown Palace}; {bride, Sarah Martin}; {groom, Dave Hasting}; and the like. In aspects, each attribute-value pair can be seen as a fact that is a potential answer for a set of factual questions. For example, with reference to the attribute-value pairs listed above, the fact "Aug. 8, 2013" can be identified as an answer to the factual question "When was Sarah's wedding?" Similarly, based on the attribute-value pairs above, the fact "Sarah Martin" can be identified as an answer to the factual question "Who is Dave Hasting's wife?" Moreover, further extrapolation can be performed to identify related answers to attribute-value pairs. For instance, a related answer "Thursday" can be extrapolated from the fact "Aug. 8, 2013" as an answer to the factual question "What day was Sarah's wedding?" In aspects, a question and answer component (e.g., Q&A generation component 120) may perform answer identification operation 302 for each attribute-value pair identified in each document of the document collection.

At question generation operation 304, one or more factual questions can be generated based on each fact associated with an attribute-value pair. In aspects, generating the one or more factual questions may be performed prior to receiving a search query during an interim or offline period. As may be appreciated, a plurality of different factual questions may yield the same fact or answer. For instance, the factual questions "Who is Dave Hasting's wife?"; "Who did Dave Hasting's marry?" and "What is the bride's name for the wedding on Aug. 8, 2013?" would each yield the same answer based on the attribute-value pairs detailed above, i.e., "Sarah Martin." In aspects, at least one factual question is generated for each answer identified for an attribute-value pair. In some aspects, one or more factual questions may be generated automatically for each answer. For example, one or more factual questions may be automatically generated based on any suitable algorithm either currently known or developed in the future. In aspects, a question and answer generation component (e.g., Q&A generation component 120) may perform question generation operation 304 for each identified answer associated with each relation for each document in a document collection.

At correlate operation 306, each identified answer may be correlated with one or more factual questions. Correlation operation 306 may be performed prior to receiving a search query during an interim or offline period. For example, correlate operation 306 may generate a structured data set, such as a table or index, which correlates each identified answer with one or more factual questions for which the answer could be returned. In aspects, correlate operation 306 may be performed for each answer identified for each attribute-value pair associated with each document of a document collection. As may be appreciated, correlate operation 306 may organize answers correlated with one or more factual questions in a suitable structure or format that can be read by a search engine during runtime. For example, a plurality of answer-question pairs may be associated with each document. In some aspects, as noted above, the same answer may be returned for different factual questions. In this case, more than one answer-question pair for a document may reference the same answer, e.g., answer$^1$-question$^1$ and answer$^1$-question$^2$. In other aspects, rather than generating answer-question pairs, an index may be generated wherein each answer is associated with a reference or pointer to one or more factual questions. For simplified discussion, the term "answer-question pair" encompasses any technique either presently known or developed in the future for directly or indirectly correlating an answer with a factual question. In aspects, a question and answer component (e.g., Q&A generation component 120) may perform correlate operation 306 for each identified answer for each document in a document collection.

At associate operation 308, each answer that is correlated with a factual question (e.g., each answer-question pair) may be associated with the document. In aspects, associate operation 308 may be performed during an interim or offline period prior to receiving a search query. For instance, one or more answer-question pairs may be appended to the document as metadata. In other aspects, one or more answer-question pairs may be associated with the document using pointers directed to one or more alternative storage locations for the answer-question pairs. In still other aspects, one or more answer-question pairs may be added to a header or other field associated with the document. In some cases, one or more answer-question pairs may be associated with the document in a structured format that can be read by a search engine (e.g., search engine 170) during runtime. In aspects, a question and answer component (e.g., Q&A generation component 120) may perform associate operation 308 for each document in a document collection.

Figure 4:
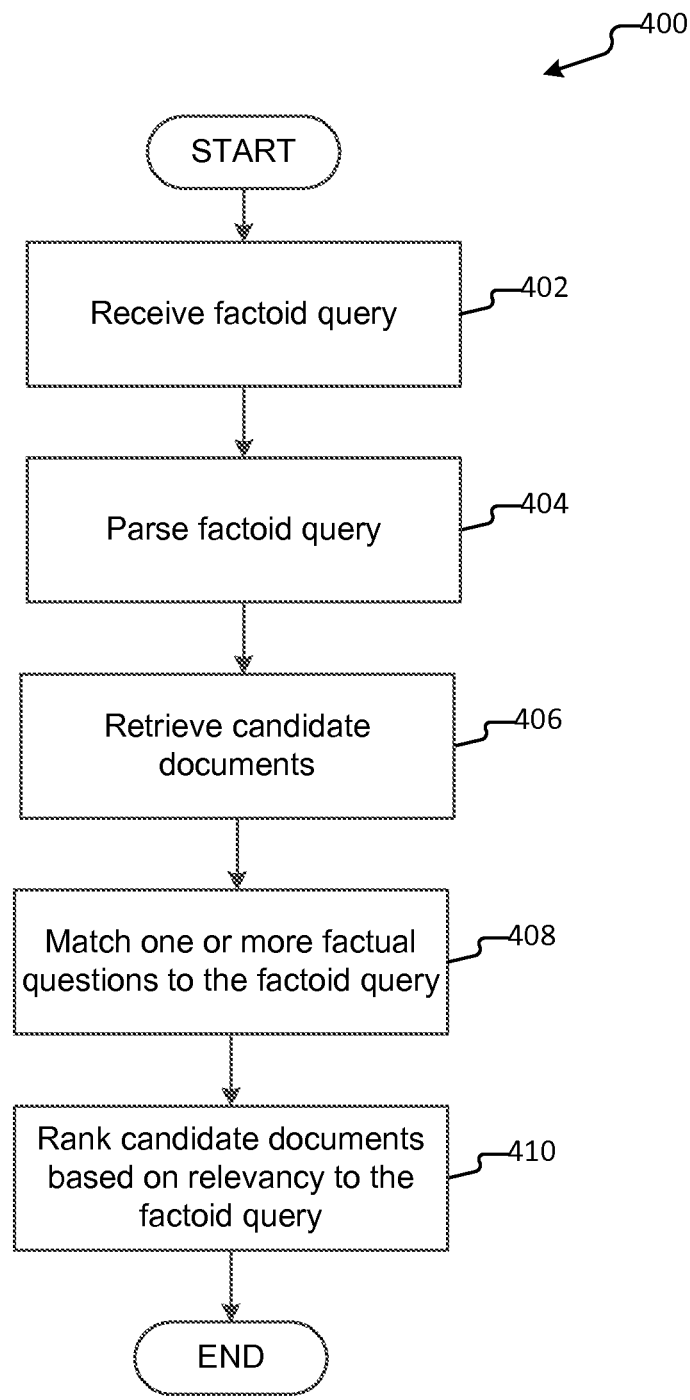
FIG. 4 illustrates an exemplary method for identifying and ranking candidate documents in response to a factoid query, according to an example embodiment.

As should be appreciated, operations 302-308 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 4 illustrates an exemplary method for identifying and ranking candidate documents in response to a factoid query, according to an example embodiment.

Method 400 begins at receive query operation 402 where a search query is received by a search engine. For example, the search query (e.g., factoid query) may be input by a user (e.g., user 102) into a client computing device (e.g., client computing device 104), routed through a network (e.g., network 106), and received by a server computing device (e.g., server computing device 108) running a search engine (e.g., search engine 170). In aspects, the search query may be received as textual input from the user. Alternatively, the search query may be received as spoken input from the user and converted to textual input. For example, spoken input may be converted to textual input using standard speech recognition techniques known to those skilled in the art such as "automatic speech recognition" (ASR), "computer speech recognition", and "speech to text" (STT). Alternatively still, the search query may be a machine-generated query initiated by a computing device. As provided herein, when the search query is received, a runtime period begins.

In aspects, the term "search query" broadly refers to any request for information posed to a search engine. In response to the search query, the search engine may generally identify all documents in a document collection that match the search criteria (the "candidate documents"), rank the candidate documents based on a predicted relevance to the search criteria, and present the results to the user beginning with the most relevant candidate document. In performing the above tasks during runtime, it is desirable that the search engine both quickly return the results and accurately predict the most relevant candidate documents based on the search criteria. In fact, users have come to expect such rapid and accurate results.

However, it may be difficult for search engines to efficiently and precisely respond to a particular subset of search queries referred to a factoid queries. As used here, a "factoid query" is a type of search query that requests a precise or discrete answer. In this case, the search engine is required not only to return the most relevant candidate documents to the factoid query, but also to evaluate the candidate documents to identify a desired (or best) answer to the factoid query. That is, with this type of search query, users are generally more interested in the precise answer to the factoid query rather than in the candidate documents themselves, which would need to be reviewed by the user to retrieve the desired answer. In fact, user dissatisfaction may result if the search engine merely returns the relevant candidate documents without providing the desired answer. Even so, users are generally unaware of the additional processing required to respond to factoid queries and still demand rapid, accurate results from the search engine.

Additionally, challenges arise in processing factoid queries when different or conflicting answers exist within documents of a document collection. For instance, while the factoid query "What is the capital of California?" may return a single unique answer "Sacramento," other factoid queries are not so straightforward. In some cases, different answers to the factoid query may be referenced in different documents within the document collection. Moreover, different answers may be desired by different users based on a user perspective or other situational or ancillary factors.

For instance, numerous conflicting answers within a set of candidate documents may be returned based on the factoid query, "Who is the President?" In aspects, the candidate documents may identify different answers depending on the date of the candidate document, a geographic location associated with the candidate document, an organizational entity referenced by the candidate document, etc. Moreover, an answer desired by a first user inputting a factoid query from an IP address associated with a first geographic location may be different from an answer desired by a second user inputting the same factoid query from an IP address associated with a second geographic location.

With reference to the above factoid query, the desired answer from the perspective of a first user may be "President Obama" (e.g., the President of the United States), whereas the desired answer from the perspective of a second user may be "Pranab Mukherjee" (e.g., the President of India). While both answers are technically "correct" based on the document collection, the first user may be highly dissatisfied if the search engine returns the answer "President Pranab Mukherjee," and the second user may be highly dissatisfied if the search engine returns the answer "President Barak Obama." Thus, in addition to evaluating the returned candidate documents to identify precise answers to the factoid query, the search engine must also evaluate additional factors and/or clues to determine which answer is desired by a particular user. It is in light of these considerations that method 400 seeks to rank candidate documents in response to a factoid query.

At parse operation 404, the received factoid query is parsed to identify relations (or keys) associated with the factoid query. The term "parsing" as used herein refers to evaluating the factoid query based on linguistics (e.g., morphology, syntax, semantics, input language, and the like), ancillary hints (e.g., geographic indicators, user search history, and the like), or otherwise, to identify search criteria for the factoid query. For instance, a particular factoid query may contain particular terms, particular semantics, and be associated with a particular geographic indicator (e.g., based on an IP address associated with a client computing device). Another factoid query may contain different terms, different semantics, but the same geographic locator, for example. Alternatively, another factoid query may contain different terms or semantics, but based on ascribing a same or similar meaning to these terms and semantics, the same or similar search criteria may be ascribed to this factoid query. Any combination of such search criteria is possible. In aspects, parse operation 404 may be performed on the factoid query by a document ranking component (e.g., relevancy ranking component 130) by any suitable means either presently known or developed in the future.

At retrieve operation 406, one or more documents are retrieved from the document collection based on the factoid query. In aspects, documents are retrieved based on the search criteria, including the relations (or keys), identified for the factoid query. In some aspects, additional clues may be taken into consideration when retrieving documents, e.g., a geographic locator, semantics, etc. The retrieved documents may be referred to herein as "candidate documents." In some cases, retrieve operation 406 may be performed by a relevancy ranking component (e.g., relevancy ranking component 130) by any suitable means either presently known or developed in the future.

At match operation 408, the parsed factoid query may be compared to one or more factual questions associated with each candidate document that was retrieved based on the search criteria. As detailed above, during an interim or offline period, answer-question pairs may be associated with each document of the document collection. For example, the answer-question pairs may be appended as metadata, associated using pointers, added to a header field, or otherwise associated with each document of the document collection. Furthermore, the answer-question pairs may be readable by the search engine during runtime. Thus, during runtime, the search engine may compare the factoid query to the factual questions associated with each candidate document returned based on the search criteria. In some cases, metadata for each candidate document may be scanned during runtime to identify factual questions that match the factoid query. In other cases, pointers for each candidate document may be followed during runtime to identify factual questions that match the factoid query.

In aspects, when a factual question "matches" the factoid query, it may share at least some of the search criteria identified for the factoid query (e.g., particular terms, particular semantics, particular geographic indicator, etc.). In this case, some factual questions may "match" the factoid query more closely than others. In aspects, a question-document pair (q, d) may be associated with each candidate document having a factual question that matches the factoid query. In aspects, match operation 408 may be performed by a relevancy ranking component (e.g., relevancy ranking component 130) by any suitable means either presently known or developed in the future.

In at least some aspects, match operation 408 may be performed without utilizing a search index. As used herein, the term "search index" refers to a traditional search index that is created by identifying a plurality of keys within each document (or document property) of a document collection. A "key" refers to any data item, such as a word, phrase, number, equation, image, audio link, video link, hyperlink, and the like, contained in one or more documents or document properties of a document collection. A document property may refer to a title property, body property, metadata property, etc. The plurality keys are then mapped to the documents (or document properties) in the search index. Thereafter, upon receiving a search query having one or more search keys, the search keys may be compared to the search index to identify matching keys. A document mapped to a matching key may then be flagged as a candidate document that is relevant to the search keys, and thus, relevant to the search query. In some aspects, using a search index enables a traditional search engine to quickly identify candidate documents without scanning each document of the document collection during runtime. In at least some aspects, however, retrieve operation 406 may be performed using a search index, or any other suitable method or process for retrieving documents based on the search criteria.

In aspects, rather than creating a search index, answers correlated with factual questions may be associated with each document of a document collection on a document-by-document basis. Thus, in aspects, match operation 408 involves evaluating factual questions associated with each candidate document to identify matches with the factoid query, rather than scanning keys in a search index that are mapped to the documents. In some aspects, the factual questions are stored as metadata with each candidate document and the metadata of each candidate document is evaluated to identify matches to the factoid query.

At ranking operation 410, each candidate document, or (q, d) pair, may be ranked based on a predicted relevancy to the factoid query. For example, the search engine may apply a ranking function, or algorithm, to one or more characteristics, or ranking features, of the candidate documents to obtain a score for each candidate document. Traditionally, ranking features may include static features, e.g., related to the type, date, or length of the candidate document, or dynamic features, e.g., based on term frequencies or document frequencies. Term frequency refers to the number of times a term occurs in a document (or in a particular property of the document, e.g., title property, body property, etc.). Document frequency refers to the number of documents in the document collection in which the term occurs. For example, for a factoid query with a certain set of search criteria (e.g., particular terms, semantics, etc.), a candidate document that exhibits a higher frequency of the particular terms, for instance, may be ranked higher. Upon applying the ranking algorithm, the candidate documents, or (q, d) pairs, are ordered based on decreasing predicted relevance to the factoid query. For instance, a first candidate document $(q_1, d_1)$ may be the highest ranking, and thus most relevant, candidate document to the factoid query. Thereafter, a second candidate document $(q_2, d_2)$, having higher relevancy than a third candidate document $(q_3, d_3)$, and so on, are ranked in order of decreasing relevancy to the factoid query. In aspects, ranking operation 410 may be performed by a relevancy ranking component (e.g., relevancy ranking component 130) by any suitable means either presently known or developed in the future.

As should be appreciated, operations 402-410 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
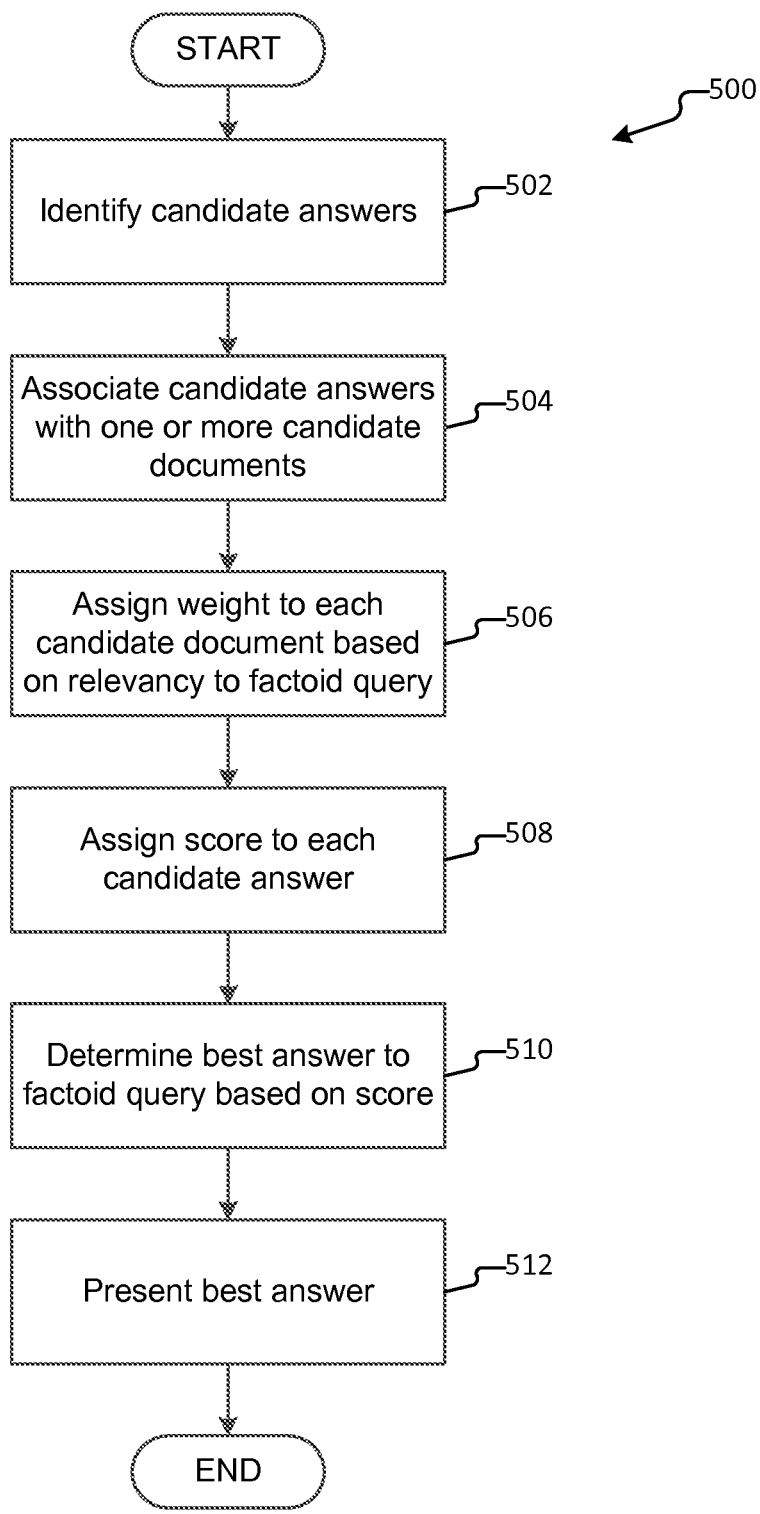
FIG. 5 illustrates an exemplary method for identifying and scoring candidate answers to a factoid query, according to an example embodiment.

FIG. 5 illustrates an exemplary method for identifying and scoring candidate answers to a factoid query, according to an example embodiment.

Method 500 begins with identify answer operation 502 where one or more candidate answers to the factoid query are identified based on the set of candidate documents retrieved by method 400. As detailed above, in some cases, metadata for each candidate document, d, of a (q, d) pair may be scanned during runtime to identify an answer, a, correlated with the factual question, q, that matches the factoid query. In other cases, pointers for each document, d, of a (q, d) pair may be followed during runtime to identify an answer, a, correlated with the factual question, q, that matches the factoid query. Each answer, a, that is correlated with a matching factual question, q, within a candidate document, d, is called a "candidate answer." In aspects, identify answer operation 502 may be performed by an answer scoring component (e.g., answer scoring component 140) by any suitable means either presently known or developed in the future.

For instance, with reference to the example above, for the factoid query "Who is the President?" a number of candidate answers may be identified. That is, a first candidate answer, $a_1$, may be "Barak Obama," while a second candidate answer, $a_2$, may be "Pranab Mukherjee." In fact, for this example, there may be a number of different candidate answers, including a third candidate answer, $a_3$, "Joachim Gauck" (President of Germany), a fourth candidate answer, $a_4$, "C. Douglas Mcmillon" (President and CEO of Walmart), etc.

At associate operation 504, each candidate answer is associated with one or more candidate documents in which the answer was identified. That is, in aspects, the same candidate answer may be identified in a plurality of candidate documents. For instance, a first candidate answer, $a_1$, may be identified in a second candidate document $(q_2, d_2)$, a fourth candidate document $(q_4, d_4)$, and a fifth candidate document ($q_5$, $d_5$). Additionally, additional candidate answers (e.g., $a_2$, $a_3$, $a_4$, etc.) may be identified in other candidate documents. For example, a second candidate answer, $a_2$, may be associated with a first candidate document ($q_1$, $d_1$) and a third candidate document ($q_3$, $d_3$). Alternatively, a third candidate answer, $a_3$, may be associated with a ninth candidate document ($q_9$, $d_9$) and a fourth candidate answer, $a_4$, may be associated with a twentieth candidate document ($q_{20}$, $d_{20}$), and so on. In aspects, associate operation 504 may be performed by an answer scoring component (e.g., answer scoring component 140) by any suitable means either presently known or developed in the future.

At weight assignment operation 506, a weight, w (or relevancy factor) may be assigned to each candidate document based on an associated relevancy ranking. In aspects, the weight may be based on any suitable scale, e.g., as a function of decreasing relevancy, and may be assigned by any suitable means, e.g., applied as a simple multiplier. For instance, in some cases, the weight may be based on a simple linear function with decreasing slope. Alternatively, the weight may be based on a decreasing exponential or geometric function. For example, in this case, highly relevant candidate documents may be assigned a disproportionately high weight, with weights decreasing exponentially as candidate documents become less relevant. Alternatively, using a simple linear function, the first candidate document ($q_1$, $d_1$) may be assigned a weight of "1"; the second candidate document ($q_2$, $d_2$) may be assigned a weight of "0.99"; the third candidate document ($q_3$, $d_3$) may be assigned a weight of "0.98"; and so on. In aspects, an appropriate weight scale may be selected based on the number of candidate documents. For example, for a set of ten candidate documents, weights of "1", "0.9", "0.8", "0.7", and so on, may be appropriate. Alternatively, for a set of 100 candidate documents, weights of "1", "0.99", "0.98", "0.97", and so on, may be appropriate. In aspects, weight assignment operation 506 may be performed by an answer scoring component (e.g., answer scoring component 140) by any suitable means either presently known or developed in the future.

At assign score operation 508, each candidate answer may be assigned a score that is a function of the number of candidate documents in which the candidate answer was identified and the relevancy of those candidate documents to the factoid query. For example, in some aspects, a score for each candidate answer may be calculated as a simple sum of weighted candidate documents in which the candidate answer was identified. In other aspects, other scoring functions may be utilized. In general, a higher score is awarded to a candidate answer that is identified in more relevant candidate documents and/or a larger number of candidate documents. In general, the score for an answer identified in a first candidate document ($d_1$, $q_1$) with a first relevancy ranking (represented by first weight, $w_1$) and in a second candidate document ($d_2$, $q_2$) with a second relevancy ranking (represented by second weight, $w_2$) may be described as follows:

$$\text{Score}(a) = w_1 * (q_1, d_1) + w_2 * (q_2, d_2)$$

Where the score of the answer, a, is based on the number of candidate documents in which the answer was returned, in this example, two candidate documents (i.e., the first candidate document ($q_1$, $d_1$) and the second candidate document ($q_2$, $d_2$)), and on the relative relevancy ranking of each candidate document, e.g., represented by first weight, $w_1$, and second weight, $w_2$. As described above, the weight, w, for each candidate document may be based on any suitable scale (whether linear, exponential, or otherwise) such that a relative relevancy for each candidate document may be accounted for in the score of a candidate answer.

For instance, based on the examples outlined above, a first candidate answer, $a_1$, was returned in a second candidate document (in the example, assigned a weight of "0.99" based on its relative relevancy ranking), a fourth candidate document (in the example, assigned a weight of "0.97" based on its relative relevancy ranking), and a fifth candidate document (in the example, assigned a weight of "0.96" based on its relative relevancy ranking). In this example, a score for the first candidate answer, $a_1$, may be calculated as follows:

$$\text{Score}(a_1) = (0.99) * (q_2, d_2) + (0.97) * (q_4, d_4) + (0.96) * (q_5, d_5) = 2.92$$

Alternatively, as detailed above, a second answer, $a_2$, was returned in a first candidate document (in the example, assigned a weight of "1.0" based on its relative relevancy ranking) and a third candidate document (in the example, assigned a weight of "0.98" based on its relative relevancy ranking). A third answer, $a_3$, was returned by a ninth candidate document (in the example, assigned a weight of "0.92" based on its relative relevancy ranking) and a fourth answer, $a_4$, was returned in a twentieth document (in the example, assigned a weight of "0.81" based on its relative relevancy ranking). In this example, the scores for the second, third and fourth candidate answers (e.g., $a_2$, $a_3$, $a_4$), may be calculated as follows:

$$\text{Score}(a_2) = (1) * (q_1, d_1) + (0.98) * (q_3, d_3) = 1.98$$

$$\text{Score}(a_3) = (0.92) * (q_9, d_9) = 0.92$$

$$\text{Score}(a_4) = (0.81) * (q_{20}, d_{20}) = 0.81$$

According to this example, the first candidate answer, $a_1$, was identified in slightly less relevant candidate documents (e.g., second, fourth and fifth candidate documents) than the second candidate answer, $a_2$ (e.g., first and third candidate documents). However, the first candidate answer received a higher score (e.g., 2.92) than the second candidate answer (e.g., 1.98) because the first candidate answer was identified in more candidate documents (e.g., three candidate documents) than the second candidate answer (e.g., two candidate documents). Alternatively, if the weight scale applied had been based on a decreasing exponential or geometric function, the second candidate answer may have received a higher score because it was identified in candidate documents with higher relevancy rankings. In aspects, scoring of the candidate answers may be adapted or tailored such that the most likely answer to the factoid query receives the highest score. For instance, an appropriate scoring algorithm may be tailored based on statistical analysis, learning algorithms, or any other suitable method, to strike an appropriate balance between the relevancy ranking of candidate documents and the number of candidate documents that return a particular candidate answer. In aspects, assign score operation 508 may be performed by an answer scoring component (e.g., answer scoring component 140) by any suitable means either presently known or developed in the future.

At determination operation 510, a best answer to the factoid query is determined In aspects, the best answer to the factoid query is the candidate answer that was assigned the highest score at score operation 508. In further aspects, the best answer is an answer that is most likely desired by a user. In aspects, determination operation 510 may be performed by an answer scoring component (e.g., answer scoring component 140) by any suitable means either presently known or developed in the future.

At presentation operation 512, the best answer to the factoid query is displayed or otherwise provided to a user. In some aspects, the candidate documents in which the best answer was identified may be displayed to the user in order of decreasing relevancy. In other aspects, the candidate documents in which the based answer was identified are not displayed to the user, but may be retrieved upon request. In aspects, presentation operation 512 may be performed by an answer presentation component (e.g., answer presentation component 150) by any suitable means either presently known or developed in the future.

As should be appreciated, operations 502-512 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
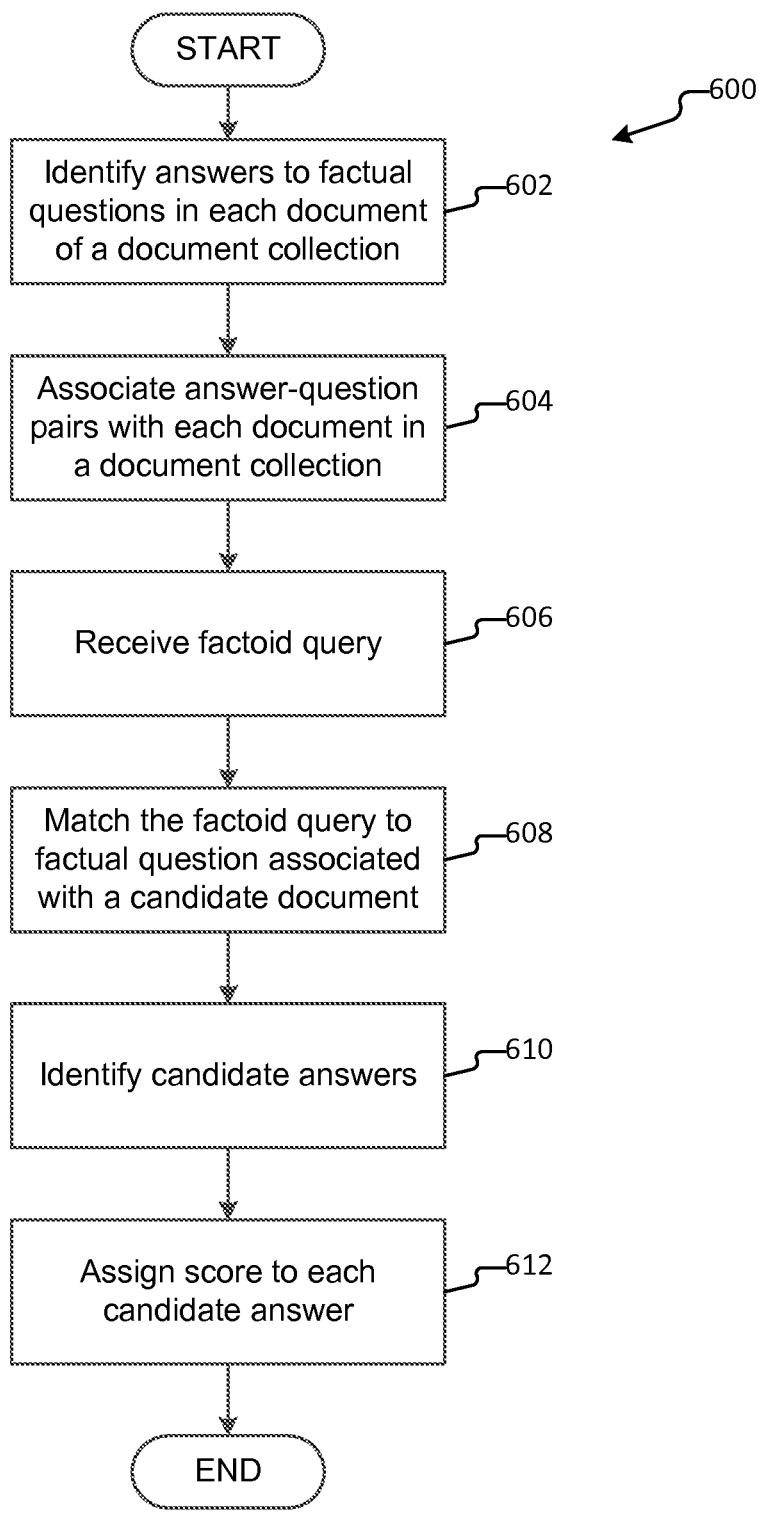
FIG. 6 illustrates an exemplary method for efficient factual question answering in a search environment, according to an example embodiment.

FIG. 6 illustrates an exemplary method for efficient factual question answering in a search environment, according to an example embodiment.

Method 600 begins with answer identification operation 602 where one or more answers to one or more factual questions are identified in each document of a document collection. In aspects, answer identification operation 602 may be performed prior to receiving a search query during an interim or offline period. In some aspects, answers to factual questions may be identified based on attribute-value pairs associated with a document, such as {date, Aug. 8, 2013}; {time, 6:00 pm}; {location, Brown Palace}; {bride, Sarah Martin}; {groom, Dave Hasting}; and the like. That is, in aspects, each attribute-value pair can be seen as a fact that is a potential answer for one or more factual questions. For example, with reference to the attribute-value pairs listed above, the fact "Aug. 8, 2013" can be identified as an answer to the factual question "When was Sarah's wedding?" Similarly, based on the attribute-value pairs above, the fact "Sarah Martin" can be identified as an answer to the factual question "Who is Dave Hasting's wife?" Moreover, further extrapolation can be performed to identify related answers to attribute-value pairs. For instance, a related answer "Thursday" can be extrapolated from the fact "Aug. 8, 2013" as an answer to the factual question "What day was Sarah's wedding?" In aspects, a question and answer component (e.g., Q&A generation component 120) may perform answer identification operation 602 for each attribute-value pair identified in each document of the document collection.

At associate operation 604, each answer to a factual question (e.g., each answer-question pair) may be associated with the document. In aspects, associate operation 604 may be performed during an interim or offline period prior to receiving a search query. For instance, one or more answer-question pairs may be appended to the document as metadata. In other aspects, one or more answer-question pairs may be associated with the document using pointers directed to one or more alternative storage locations for the answer-question pairs. In still other aspects, one or more answer-question pairs may be added to a header or other field associated with the document. In some cases, one or more answer-question pairs may be associated with the document in a structured format that may be read by a search engine (e.g., search engine 170) during runtime. In aspects, a question and answer component (e.g., Q&A generation component 120) may perform associate operation 604 for each document in a document collection.

At receive query operation 606, a search query is received by a search engine. For example, the search query (e.g., factoid query) may be input by a user (e.g., user 102) into a client computing device (e.g., client computing device 104), routed through a network (e.g., network 106), and received by a server computing device (e.g., server computing device 108) running a search engine (e.g., search engine 170). In aspects, the search query may be received as textual input from the user. Alternatively, the search query may be received as spoken input from the user and converted to textual input. Alternatively still, the search query may be a machine-generated query initiated by a computing device. As provided herein, when the search query is received, a runtime period begins. In further examples, upon receiving the search query, one or more candidate documents may be retrieved based on search criteria related to the search query.

At match operation 608, the search query may be parsed and identified with a factoid query. Further, the factoid query may be compared to one or more factual questions associated with each candidate documents retrieved from the document collection. As detailed above, during an offline processing period, one or more answer-question pairs may be associated with each document of the document collection. For example, the one or more answer-question pairs may be appended as metadata, associated using pointers, added to a header field, or otherwise associated with each document of the document collection. During runtime, the search engine (e.g., search engine 170) compares the factoid query to the factual questions associated with each candidate document. For instance, in some cases, metadata for each candidate document may be scanned during runtime to identify factual questions that match the factoid query. In other cases, pointers for each candidate document may be followed during runtime to identify factual questions that match the factoid query.

In aspects, a question-document pair (q, d) may be associated with each document having a factual question that matches the factoid query. Moreover, based on a correlation established by the answer-question pairs, when a matching factual question is identified, the corresponding answer (e.g., "candidate answer") to the factual question may be obtained from the answer-question pair to which the factual question belongs. Alternatively, e.g., when answers are correlated to factual questions based on an index, the corresponding answer to the factual question may be obtained by reference to the index. In aspects, a question and answer component (e.g., Q&A generation component 120) may perform match operation 608 for each document in a document collection.

At identify answer operation 610, one or more candidate answers to the factoid query are identified. As detailed above, metadata for each candidate document, d, of a (q, d) pair may be scanned during runtime to identify an answer, a, correlated with the factual question, q, that matches the factoid query. In other cases, pointers for each document, d, of a (q, d) pair may be followed during runtime to identify an answer, a, correlated with the factual question, q, that matched the factoid query. Each answer, a, that is correlated with a matching factual question, q, within a candidate document, d, is called a "candidate answer." In aspects, identify answer operation 610 may be performed by an answer scoring component (e.g., answer scoring component 140) by any suitable means either presently known or developed in the future.

At assign score operation 612, each candidate answer may be assigned a score that is a function of the number of candidate documents in which the candidate answer was identified and a relevancy of those candidate documents to the factoid query. For example, in some aspects, a score for each candidate answer may be calculated as a simple sum of candidate documents in which the candidate answer was identified and adjusted by a relevancy factor for each candidate document. In general, a higher score is awarded to a candidate answer that is identified in more relevant candidate documents and/or a larger number of candidate documents. In aspects, scoring of the candidate answers may be adapted or tailored such that the most likely answer to the factoid query receives the highest score. For instance, an appropriate scoring algorithm may be tailored based on statistical analysis, learning algorithms, or any other suitable method, to strike an appropriate balance between the relevancy of the candidate documents and the number of candidate documents that return a particular candidate answer. In aspects, assign score operation 612 may be performed by an answer scoring component (e.g., answer scoring component 140) by any suitable means either presently known or developed in the future.

As should be appreciated, operations 602-612 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
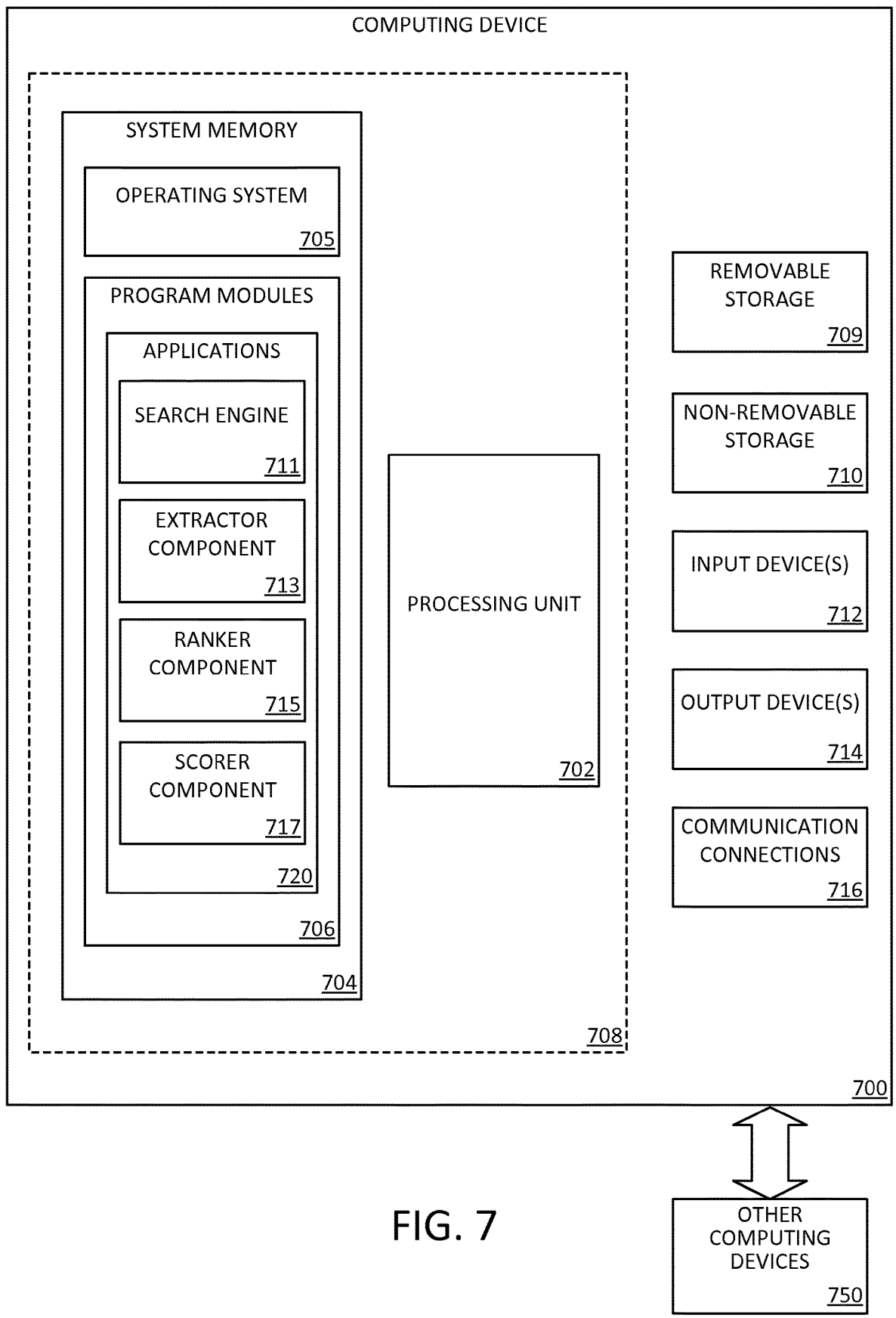
FIG. 7 is a block diagram illustrating example physical components of a computing device with which aspects of the disclosure may be practiced.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein FIG. 7 is a block diagram illustrating physical components (e.g., hardware) of a computing device 700 with which aspects of the disclosure may be practiced. The computing device components described below may have computer executable instructions for implementing efficient factual question answering on a server computing device 108, including computer executable instructions for search engine 711 that can be executed to employ the methods 200 through 600 disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as one or more components in regards to FIG. 1 and, in particular, extractor component 713, ranker component 715, or scorer component 717. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., search engine 711) may perform processes including, but not limited to, the aspects, as described herein. Other program modules that may be used in accordance with aspects of the present disclosure, and in particular for efficient factual question answering, may include extractor component 713, ranker component 715, and scorer component 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
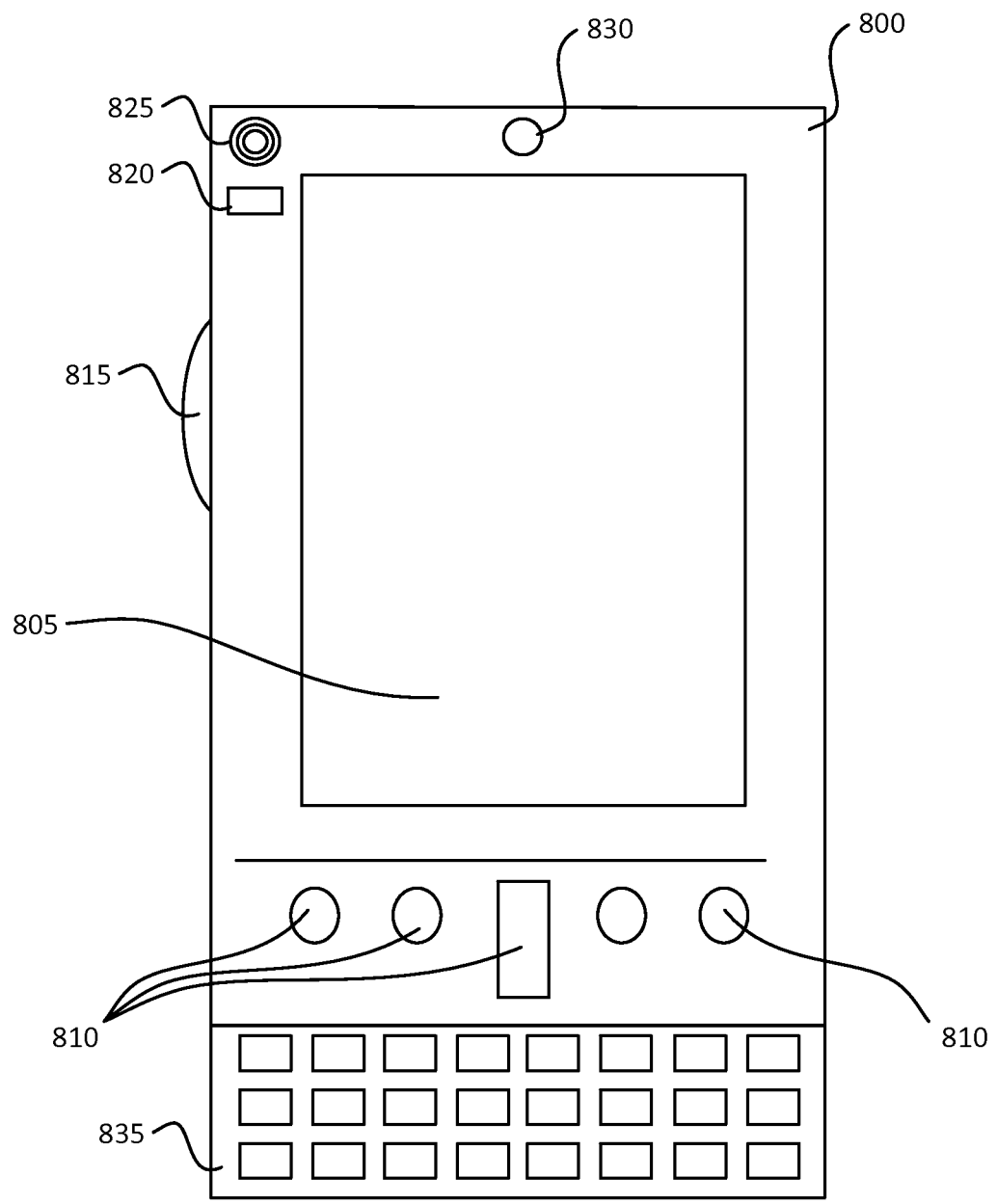
FIGS. 8A and 8B are simplified block diagrams of a mobile computing device with which aspects of the present disclosure may be practiced.
Figure 8B:
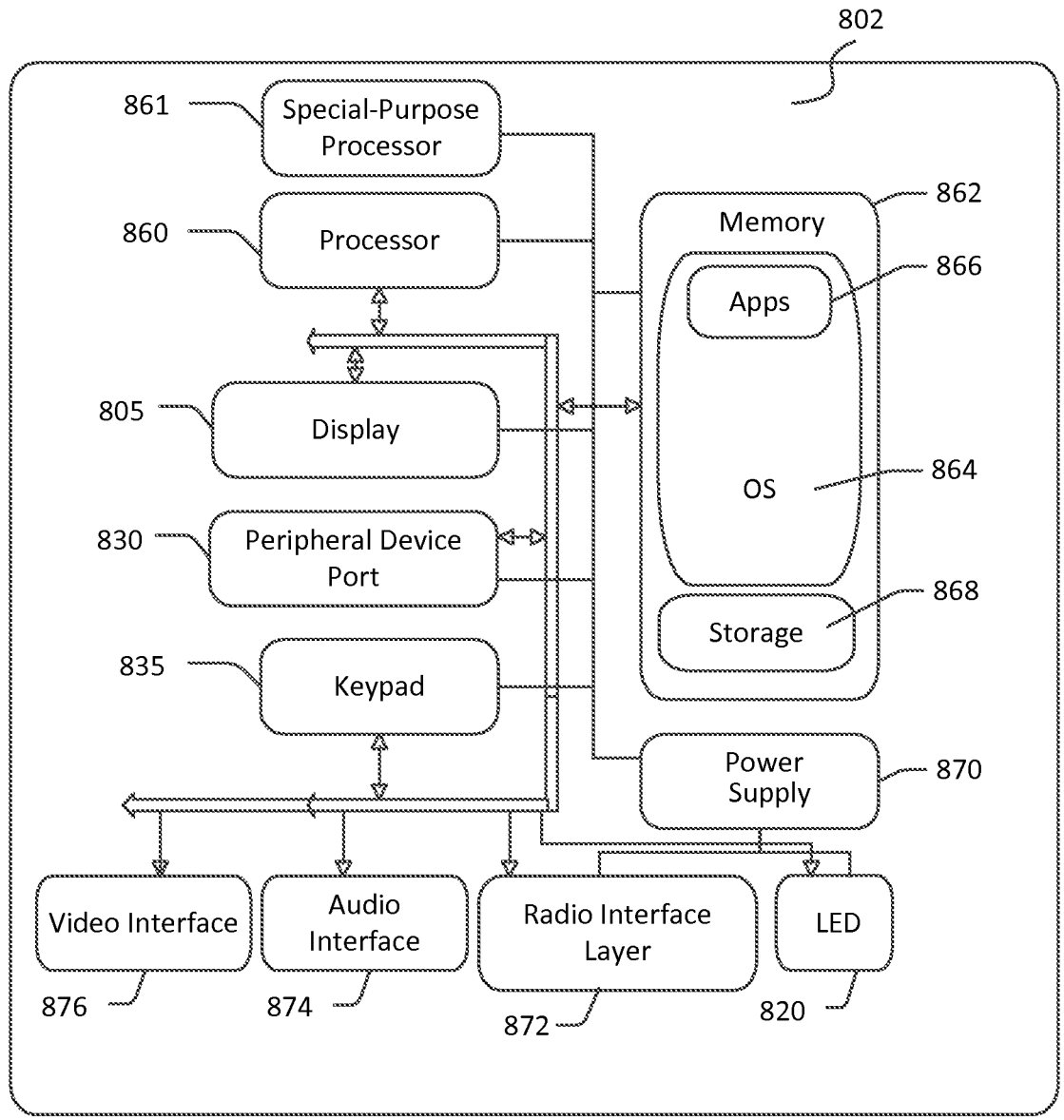

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for efficient factual question answering as described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape.

Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
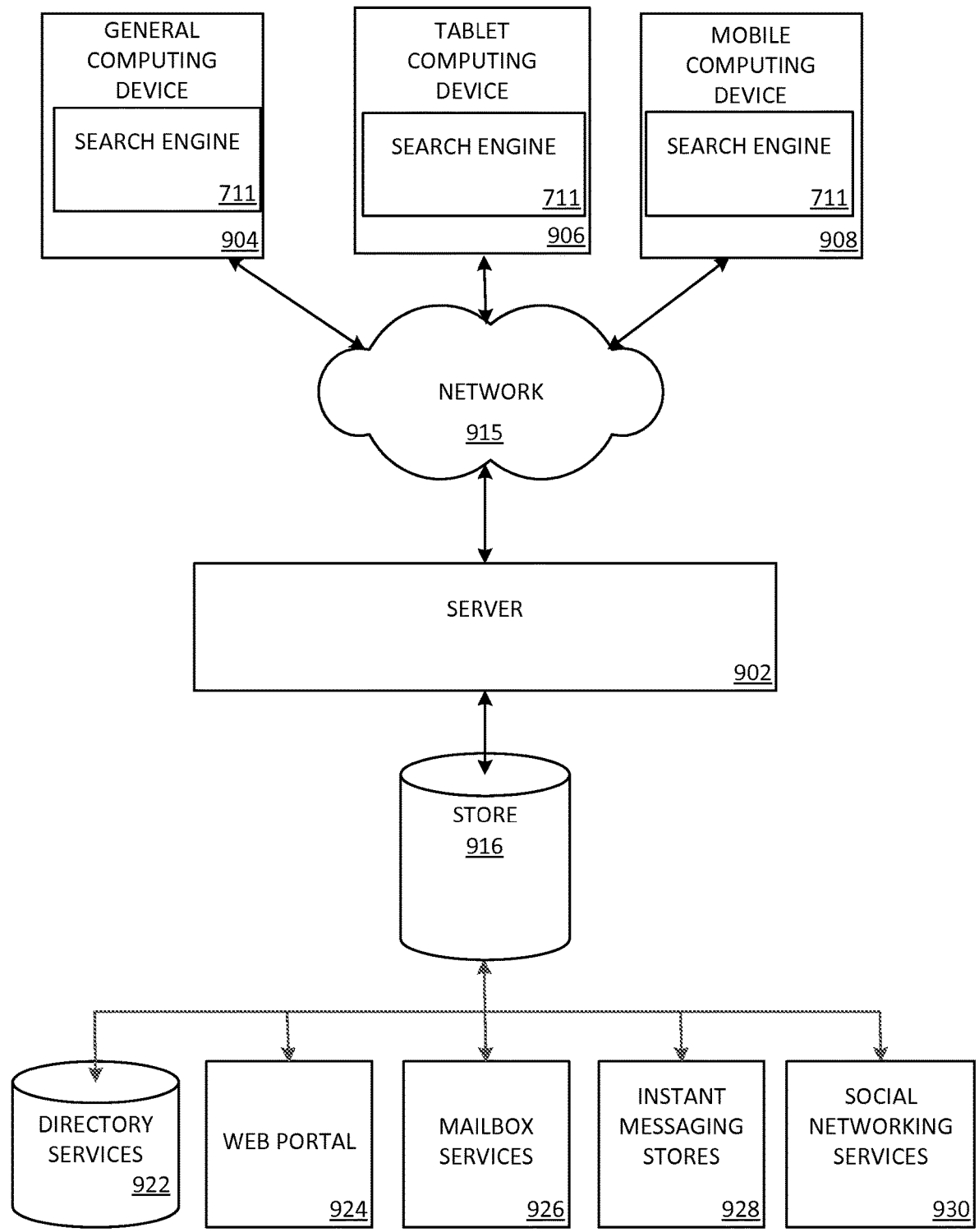
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The search engine 711 may be employed by a client who communicates with server device 902. The server device 902 may provide data to and from a client computing device such as a personal computer 904, a tablet computing device 906 and/or a mobile computing device 908 (e.g., a smart phone) through a network 915. By way of example, the computer system described above with respect to FIGS. 1-8 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
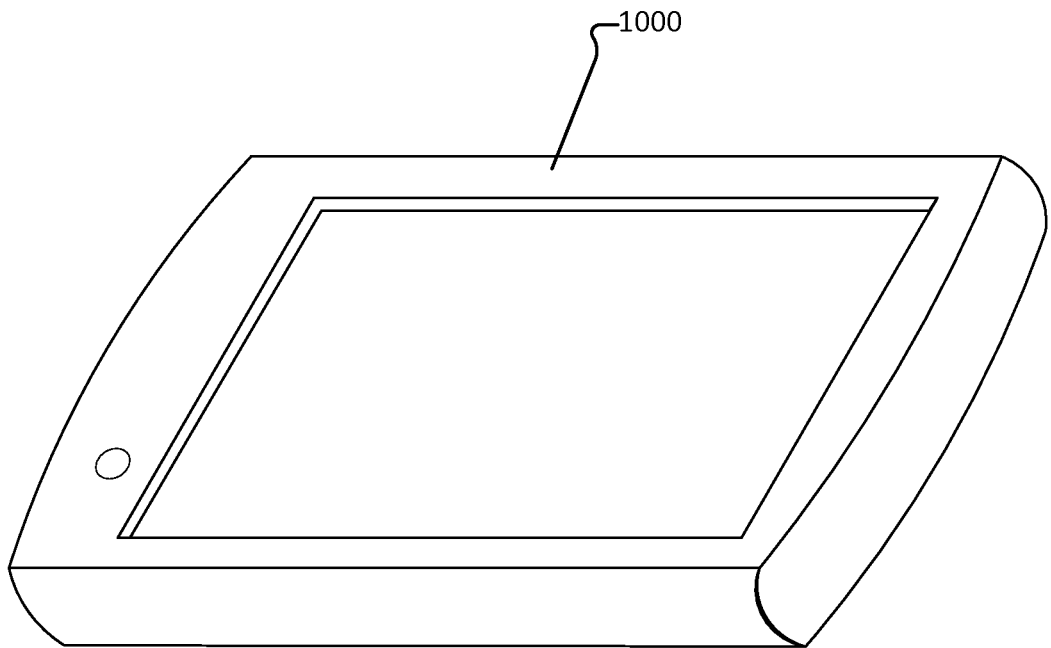
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform a method of providing an answer to a factoid query, the method comprising:
      during an offline period prior to receiving the factoid query,
         identifying one or more first attribute-value pairs within a first document of a document collection;
         identifying as a value of one of the first attribute-value pairs within the first document of the document collection, a first answer;
         generating from the value of one of the first attribute-value pairs identified as the first answer, a plurality of first factual questions, wherein the value is identified as an answer to each of the plurality of first factual questions; and
         associating the plurality of first factual questions with the first document;
      upon receiving the factoid query on a client computing device during runtime,
         matching the factoid query to a first factual question of the plurality of first factual questions associated with the first document;
         identifying the first answer correlated with the first factual question;
         calculating a first score for the first answer based, at least in part, on a determined relevancy of the first document with respect to the factoid query; and
         sending the first answer to the client computing device in response to the received factoid query during the runtime.

2. The system of claim 1, further comprising:
   identifying one or more second attribute-value pairs within a second document of the document collection;
   identifying a second answer corresponding to a second value of one of the second attribute-value pairs within the second document of the document collection;

generating a plurality of second factual questions for returning the second answer;
associating the plurality of second factual questions with the second document;
matching the factoid query to the second factual question of the plurality of second factual questions associated with the second document;
identifying the second answer correlated with the second factual question that is matched to the factoid query; and
calculating a second score for the second answer based at least in part on a relevancy of the second document to the factoid query.

3. The system of claim 1, wherein identifying the first answer within the first document comprises extracting at least one n-tuple from the first document.

4. The system of claim 3, wherein the at least one n-tuple comprises at least one first attribute-value pair of the one or more first attribute-value pairs.

5. The system of claim 4, wherein a value of a first attribute-value pair corresponds to an answer to at least one first factual question associated with an attribute of the first attribute-value pair.

6. The system of claim 2, wherein the first answer is the same as the second answer.

7. The system of claim 2, wherein the first answer is different than the second answer.

8. The system of claim 2, wherein the first factual question is different than the second factual question.

9. The system of claim 2, wherein the plurality of first factual questions associated with the first document are different than the plurality of second factual questions associated with the second document.

10. The system of claim 1, further comprising:
correlating each of the plurality of first factual questions with each of a plurality of first answers; and
associating each first answer and correlated first factual question with the first document by appending each first answer and correlated first factual question to the first document.

11. The system of claim 10, wherein each first answer and correlated first factual question are appended to the first document as metadata.

12. The system of claim 6, wherein scoring the first answer comprises:
applying a first weight to the first document based at least in part on the relevancy of the first document to the factoid query;
applying a second weight to the second document based at least in part on the relevancy of the second document to the factoid query; and
calculating the first score of the first answer as a function of the first weight and the second weight.

13. The system of claim 7, wherein scoring the first answer comprises:
applying a first weight to the first document based at least in part on the relevancy of the first document to the factoid query; and
calculating the first score of the first answer as a function of the first weight.

14. A server computing device comprising:
at least one processing unit; and
at least one memory storing computer executable instructions that, when executed by the at least one processing unit, cause the server computing system to perform a method of providing an answer to a factoid query, the method comprising:
during an offline period prior to receiving the factoid query,
identifying one or more first attribute-value pairs within a first document of a document collection;
identifying as a value of one of the first attribute-value pairs within the first document of the document collection, a first answer;
generating from the value of one of the first attribute-value pairs identified as the first answer, a plurality of first factual questions, wherein the value is identified as an answer to each of the plurality of first factual questions; and
associating the plurality of first factual questions with the first document of the document collection;
upon receiving the factoid query from a client computing device during runtime,
matching the factoid query to a first factual question of the plurality of first factual questions associated with the first document;
identifying the first answer that is correlated with the first factual question that is matched to the factoid query;
calculating a first score for the first answer based, at least in part, on a determined relevancy of the first document with respect to the factoid query; and
sending the first answer to the client computing device in response to the received factoid query during the runtime.

15. The server computing device of claim 14, further comprising:
identifying one or more second attribute-value pairs within a second document of a document collection;
identifying a second answer corresponding to a first value of one of the second attribute-value pairs within the second document of the document collection;
generating a plurality of second factual questions for returning the second answer;
associating the plurality of second factual questions with the second document;
matching the factoid query to a second factual question of the plurality of second factual questions associated with the second document;
identifying the second answer correlated with the second factual question that is matched to the factoid query; and
calculating a second score for the second answer based at least in part on a relevancy of the second document to the factoid query.

16. The server computing device of claim 15, wherein identifying the one or more second attribute-value pairs within the second document of the document collection comprises extracting at least one n-tuple from the second document.

17. The server computing device of claim 16, wherein the at least one n-tuple comprises at least one attribute-value pair.

18. The server computing device of claim 17, wherein a value of an attribute-value pair corresponds to an answer to at least one factual question associated with an attribute of the attribute-value pair.

19. A method implemented on a computing device for providing an answer to a factoid query, the method comprising:
during an offline period prior to receiving the factoid query, identifying one or more attribute-value pairs within each document of a document collection;

identifying an answer corresponding to each of the one or more attribute-value pairs within each document of the document collection;

generating from a value of one of the first attribute-value pairs identified as an answer, a plurality of factual questions for returning each answer, wherein the value is identified as an answer for each of the plurality of factual questions; and associating at least one factual question of the plurality of factual questions with at least one document of the document collection;

upon receiving the factoid query on a client computing device during runtime, matching the factoid query to a first factual question of the plurality of factual questions associated with a first document;

identifying a first answer correlated with the first factual question that is matched to the factoid query;

calculating a first score for the first answer based, at least in part, on a determined relevancy of the first document with respect to the factoid query; and;

sending the first answer to the client computing device in response to the received factoid query during the runtime.

20. The method of claim 19, further comprising:

matching the factoid query to a second factual question of the plurality of factual questions associated with a second document;

identifying a second answer correlated with the second factual question that is matched to the factoid query; and calculating a second score for the second answer based at least in part on a relevancy of the second document to the factoid query.

\* \* \* \* \*